United States Patent
Veillon et al.

(10) Patent No.: US 12,339,875 B1
(45) Date of Patent: *Jun. 24, 2025

(54) MACHINE LEARNING ARCHITECTURE FOR CONTEXTUAL DATA RETRIEVAL

(71) Applicant: AskTuring.AI Inc., La Jolla, CA (US)

(72) Inventors: David Veillon, Longmont, CO (US); Talha Jubair Siam, Dacca (BD); Eyal Leeder, San Diego, CA (US)

(73) Assignee: AskTuring.AI Inc., La Jolla, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/082,105

(22) Filed: Mar. 17, 2025

Related U.S. Application Data

(63) Continuation of application No. 18/916,406, filed on Oct. 15, 2024, now Pat. No. 12,254,029.

(51) Int. Cl.
  *G06F 16/242* (2019.01)
  *G06F 16/248* (2019.01)
  *G06F 16/28* (2019.01)

(52) U.S. Cl.
  CPC .......... *G06F 16/285* (2019.01); *G06F 16/243* (2019.01); *G06F 16/248* (2019.01)

(58) Field of Classification Search
  CPC ..... G06F 16/285; G06F 16/243; G06F 16/248
  See application file for complete search history.

(56) References Cited

U.S. PATENT DOCUMENTS

| | | | |
|---|---|---|---|
| 9,734,252 | B2 | 8/2017 | Wolfram et al. |
| 10,467,227 | B2 | 11/2019 | Kimelfeld et al. |
| 11,120,229 | B2 | 9/2021 | Roy et al. |
| 11,144,561 | B2 | 10/2021 | Miller et al. |
| 2016/0357860 | A1 | 12/2016 | Shmiel et al. |
| 2017/0024443 | A1 | 1/2017 | Dayan et al. |
| 2018/0129704 | A1 | 5/2018 | Chandrasekaran et al. |
| 2018/0143978 | A1 | 5/2018 | Chang et al. |
| 2021/0191925 | A1 | 6/2021 | Sianez |
| 2024/0354436 | A1 | 10/2024 | Mukherjee et al. |

*Primary Examiner* — Jorge A Casanova
(74) *Attorney, Agent, or Firm* — Foley & Lardner LLP

(57) ABSTRACT

A method comprises storing a database comprising sets of data each corresponding to a different digital document uploaded to the one or more processors and corresponding to a category tag assigned to the digital document corresponding to the set of data; receiving a natural language query; parsing the natural language query to generate one or more parsed tags; updating a second query form on the user interface with the one or more parsed tags; retrieving, using one or more generative language models, a subset of the sets of data based on each set of data of the subset corresponding to at least one assigned category tag of the one or more parsed tags; querying, using the one or more generative language models, the retrieved subset of the sets of data based on the natural language query to retrieve response data; and presenting a visual representation of the response data.

20 Claims, 15 Drawing Sheets

← 700

You
Show me mortgage servicing fees from Fanny May for Mr. Cooper in California

ChatBot

Mortgage Servicing Accounting fro Mr. Cooper in California

To address your question regarding mortgage servicing accounting for Mr. Cooper in California, we will refer to the relevant sections of the Fannie Mae Servicing Guide. The guidelines provided apply to all servicers, including Mr. Cooper, and cover various aspects of mortgage loan payment processing, remitting, accounting, and reporting

Key Sections and Requirements

1. Processing Mortgage Loan Payments

- This section outlines the procedures for processing mortgage loan payments, including the handling of adjustable-rate mortgage (ARM) loans.
- Reference: Filename : FNMA Servicing-Guide May 2024.pdf, Page Number : 231

2. Servicing ARM Loans

- Specific Guidelines for servicing ARM loans are detailed in this section, ensuring compliance with Fannie Mae's requirements.
- Reference: Filename : FNMA Servicing-Guide May 2024.pdf, Page Number : 231

FIG. 7

MACHINE LEARNING ARCHITECTURE FOR CONTEXTUAL DATA RETRIEVAL

CROSS-REFERENCE TO RELATED APPLICATIONS

This application claims the benefit of priority as a continuation to U.S. patent application Ser. No. 18/916,406, filed Oct. 15, 2024, the entirety of which is incorporated by reference.

BACKGROUND

Generative artificial intelligence (GenAI) user interfaces are designed to allow users to interact with AI systems to create content, perform tasks, and/or generate new data. These interfaces can vary widely depending on the specific application, from simple text-based interfaces to complex, interactive platforms.

GenAI systems can use Retrieval Augmented Generation (RAG) techniques to generate responses to queries. RAG techniques can involve using a vector database to provide context to large language models (LLMs) to generate context-driven responses. The vector database can include embeddings generated using domain-specific data to provide domain-specific context to the LLMs during response generation.

However, the large amount of data that can be stored in a vector database can create significant challenges for LLMs querying the vector database. For instance, the sheer volume and diversity of data aggregated from different data sources can cause generating queries for querying the database to involve navigating complex data schemas and varied data formats. Additionally, at least in the case of structured data (e.g., tables, spreadsheets, or CSV files), data that is not cleaned or normalized data can make retrieving and processing the data difficult. Given this complexity, a system may have difficulties generating a query that will result in retrieving all of the data that is necessary and relevant for generate a response to a data request.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIGS. 3-7 are example GUIs in the system of FIG. 1, according to some implementations;

Figure 1:
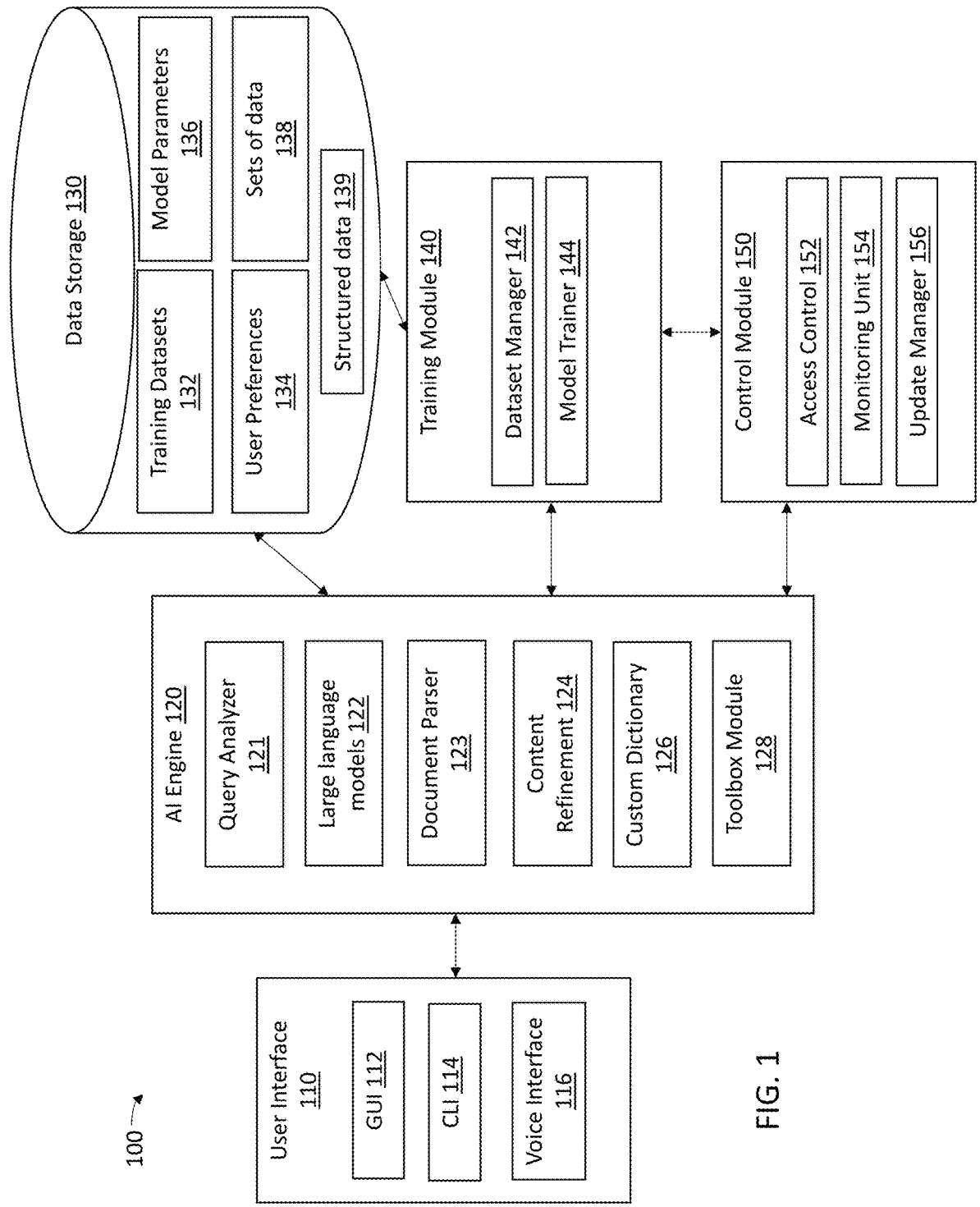
FIG. 1 is a block diagram of an example computing system that includes a generative AI user interface, according to some implementations.

The details of various embodiments of the methods and systems are set forth in the accompanying drawings and the description below.

DETAILED DESCRIPTION

In the following description, reference is made to the accompanying drawings, which form a part hereof. In the drawings, similar symbols typically identify similar components, unless context dictates otherwise. The illustrative embodiments described in the description, drawings, and claims are not limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

For purposes of reading the description of the various embodiments below, the following descriptions of the sections of the specification and their respective contents may be helpful:

Section A describes embodiments of systems and methods for a machine learning architecture for contextual data retrieval; and Section B describes a computing environment which can be used for practicing embodiments described herein.

A. Systems and Methods for a Machine Learning Architecture for Contextual Data Retrieval Conventional generative AI (GenAI) systems struggle with several technical problems. Technical problems in GenAI system can be the result of data requirements of large datasets with low quality data; high computational power and energy consumption; complex and large models; lack of transparency; an inability to handle ambiguity and context; and many other issues. For example, GenAI systems have been known to generate incorrect or misleading results, which is known as a "hallucination." AI models also have the technical problem of including bias from unfair or stereotypical content resulting from training data which includes societal biases. The impact of data used by GenAI models makes it important to protect the integrity and privacy of data with large language models (LLMs) used by such systems.

Yet another technical problem with conventional generative AI systems originates from the large amounts of energy needed to both train and operate the systems due to the vast amounts of data the model is trained on, the complexity of the large language model, and the volume of requests made by users. Likewise, the large number of calculations and large data sets require generative AI systems to use substantial computational power and memory.

In one example, a system may attempt to generate responses to natural language queries by implementing large language models. Such a system may do so, for example, by inputting a natural language query into a large language model and executing the large language model. Based on the execution, the large language model can convert the natural language query into a database query (e.g., an embedding or vector) and search a database for data to use to respond to the natural language query. The large language model can retrieve data to use to respond to the natural language query based on a similarity between the database query and the data. The large language model can then formulate a response based on the retrieved data. However, such a data retrieval and response generation system may face multiple difficulties in accurately and efficiently generating responses to queries. For example, as mentioned above, large language models are prone to hallucinations. Typical causes of hallucinations may be a lack of context, misleading prompts, rare or uncommon inputs, exploiting biases, incorrect and incomplete data retrieval, noise in the input data, and attempts at creative writing. If an LLM attempts to query a large database with data in varying formats, any of these causes can be compounded and result in incorrect or incomplete responses (e.g., such as because there may be multiple types of data in the database that are similar to natural language query used to query the database). Another challenge that may arise is that the LLM may attempt to inject data into the database or otherwise change the data within the database during the query. An LLM may attempt to do so, for example, due to programming errors, improper synchronization, application programming interface (API) issues, etc. Yet another challenge is that data stored in the database may be constantly changing. A trained LLM may be "stuck in time" based on old data. Training the LLM based on new data can be resource intensive and impractical, particularly for rapidly changing data, such as stock market prices for a day.

To address these and other technical challenges, a computing system or computing device implementing the systems and methods described herein may implement a tagging system that can be used for storage and subsequent data retrieval. The computing system can store a database that includes sets of data generated from different digital documents. The computing system can assign one or more category tags to each of the respective sets of data representing the types of content of the digital documents from which the sets of data were generated. Subsequently, the computing system can receive a natural language query from a user interface. The natural language query can be input by a user accessing the user interface on a client device. The natural language query can be a request for data regarding or associated with at least one of the digital documents. The natural language query can be a standalone query or a follow-up query that can be combined with a chat history to obtain a standalone query. The computing system can identify (e.g., automatically identify) tags from words and/or a context of the natural language query. The computing system can present the tags at the user interface from which the computing system received the natural language query. The user that input the initial natural language query can adjust the tags by adding one or more new tags and/or removing any of the presented tags. The user can select a submit button on the user interface to cause the client device to transmit the natural language query with the tags to the computing system.

The computing system can use the natural language query and tags to query the database. For example, the computing system can receive the natural language query and tags and generate a first query to the database. The computing system can generate the first query by executing a large language model, for example. For instance, the computing system can input the tags into the large language model in a prompt with text instructions to generate a query to identify sets of data assigned with the tags. The computing system can execute the large language model to generate a first query with a schema configured to identify sets of data from the database tagged with category tags that match the tags received with the natural language query. The computing system can query the database with the first query. Based on natural language query, the computing system can identify one or more sets of data assigned with category tags matching (e.g., identically matching) the tags received with the natural language query. The computing system can generate a second query based on the natural language query using the large language model or a different large language model. The computing system can generate the second query by inputting the natural language query into the large language model and executing the large language model. Based on the execution, the large language model can generate and output a second query for querying the retrieved datasets. The second query can be a query configured to retrieve data relevant to responding to the natural language query. The computing system can use the second query to query the identified datasets (e.g., by using an application programming interface) for response data that can be used to generate a response to the natural language query. The computing system can present the response at the client device that transmitted the initial natural language query to the computing system. In this way, the computing system can use the tagging method to break up the data retrieval process to initially retrieve relevant sets of data to use to generate a response and then retrieve data from the relevant sets of data that are more closely related to generating an accurate and complete response. Doing so can reduce the noise in the data that the large language model uses to generate the response, thus reducing hallucinations in the response while also reducing the likelihood of making improper changes to the underlying database storing the data.

Another technical challenge that arises when using a large language model to generate a response to a natural language query is that the large language model may have difficulty determining a context of data in a table. For example, sets of data for individual digital documents may be segmented and stored separately from each other within the same records for the respective digital documents. When the large language model queries a particular table for data, the large language model may not be able to determine the context of the data within the table or the table itself because the table may only include values. Thus, the LLM may not be able to accurately identify relevant data from tables to use to generate responses to natural language queries.

To overcome this technical challenge, a computing system operating as described herein may change how the segments of data within a record are stored. For instance, instead of only including a table in a segment for a digital document, the parser of the computing system can identify a paragraph immediately before and/or after (or above and/or below) the table. The parser can include the identified paragraph or paragraphs in the record with the table. Accordingly, when a large language model queries the table for data to use to generate a response to a natural language query, the large language model can identify the corresponding paragraphs associated with the table to determine a context of the table and/or data within the table. The large language model can use this context to more accurately identify and/or retrieve data from the table to use to generate responses to natural language queries regarding the data within the table.

In some cases, the computing system can use a dual pipeline architecture to facilitate generating responses to natural language queries. For example, the computing system can store a dual index (e.g., a vector database and a relational database). One index can store unstructured data and the other index can store structured data. The large language model can separately query one or both of the indices to retrieve response data to use to generate a response to a natural language query. By doing so, the large language model can perform a more refined query to retrieve more contextually relevant information to use to generate a response, such as by avoiding noise in unstructured data when only structured data is relevant to generating a response, or vice versa.

FIG. 1 is a block diagram of an example generative AI computing system 100 designed for content creation across multiple media types, including but not limited to text, images, audio, and video. The system 100 includes a user interface 110, an AI engine 120, a data storage 130, a training module 140, a system control module 150, and auxiliary components for system management and content delivery. The system 100 can be or include the computing system 1400, shown and described with reference to FIG. 14.

The user interface 110 is configured to facilitate interaction between the user and the generative AI computing system 100. The user interface 110 may include a graphical user interface (GUI) 112, a command-line interface (CLI) 114, and/or a voice-activated interface 116. The GUI 112 allows users to input parameters, view AI-generated content, and adjust using graphical elements such as buttons, sliders, and text boxes. The GUI 112 can include icons or forms that facilitate or enable a user to select specific files or folders to cause the generative AI computing system 100 to perform any queries on the selected files or folders (e.g., only the selected files or folders or the files or folders in addition to one or more other data sources, such as a local database or data stored across a network). The CLI 114 provides a text-based input mechanism, enabling users to issue commands and/or input natural language queries directly to the AI engine 120. The voice-activated interface 116 enables voice control of the system, allowing hands-free interaction with the AI engine 120, such as to input commands and/or input natural language queries using oral inputs.

The AI engine 120 can be structured as a set of instructions or logic that is executed by one or more servers or processors (e.g., the computing system 1400, shown and described with reference to FIG. 14), in some embodiments. The AI engine 120 can be configured to generate content based on user input and pre-configured or trained algorithms. The AI engine 120 can include large language models 122, a content refinement module 124, a custom dictionary 126, and/or a toolbox module 128. The large language models 122 can be or include one or more machine learning architectures such as convolutional neural networks (CNNs), recurrent neural networks (RNNs), transformers, or a combination thereof, which can depend on the content type being generated. The large language models 122 can each be trained on a dataset stored in the data storage 130, for example. The content refinement module 124 can facilitate modifying and/or improving content generation based on feedback from the user interface 110. The content refinement module 124 may utilize reinforcement learning, gradient descent, or other optimization techniques to iteratively enhance or improve the output.

The custom dictionary 126 can be a data structure, database, and/or a dataset configured to store or include organization-specific or domain-specific terminology. For example, the custom dictionary 126 can include one or more category tags that can be used to tag sets of data for digital documents stored in the data storage 130 and/or used to identify tags for natural language queries input at the user interface 110. The custom dictionary 126 can include sets of tags for different organizations. Each set of tags can be an index or associated with an index. The set of tags can be associated with an identifier of the index such that the query analyzer 121 can use the identifier of the index to retrieve the set of tags associated with the index for which the AI engine 120 is processing a natural language query. In some cases, the custom dictionary 126 can include multiple sets of tags for individual organizations. The toolbox module 128 can be configured to provide feedback on queries, structure queries, and refine follow-up queries. Each of the components 122-128 can be structured as a set of instructions or logic that is executed by one or more servers or processors (e.g., the computing system 1400, shown and described with reference to FIG. 14), in some embodiments.

The data storage 130 can store data necessary for the operation of the system 100. The data storage 130 can be or include one or more databases. The one or more databases can be or include vector databases that store vector representations of data (e.g., embeddings) and/or the data itself. For example, the data storage 130 can store training datasets 132, user preferences 134, AI model parameters 136, sets of data 138, and/or structured data 139. The data storage 130 can store each of the components 132-139 as vectors and/or as the data itself. In some cases, the data storage 130 can store separate vectors or embeddings for subcomponents of the components 132-139. Such embeddings can be generated using a machine learning architecture configured to generate embeddings from input words, phrases, symbols, etc., such as based on the characters or symbols of the words, phrases, or symbols and/or based on the context or meaning of the words, phrases, or symbols.

The large language models 122 can retrieve data from the data storage 130 based on a natural language query when the large language models 122 generate an embedding from the natural language query, compare the embedding to embeddings stored in the data storage 130, and identify embeddings with a similarity (e.g., a cosine similarity) above a threshold or a defined number of embeddings with the highest similarity with the embedding for natural language query. The large language models 122 can identify the data associated with the embeddings from the data storage 130 and retrieve the identified data from the data storage 130 to generate a response.

The training datasets 132 can be used by the training module 140 to develop and refine the AI models employed by the AI engine 120. The user preferences 134 can be stored and updated based on user interactions, allowing the system 100 to personalize content generation. The AI model parameters 136 can be continuously updated to reflect the latest training and refinements made by the AI engine 120.

The custom dictionary 126 can store a list of tags or category tags. The tags can be, identify, or correspond to topics, clients, keywords, industry organizations, contexts, subjects, etc. Examples of tags can be or include investors, servicers, states, geographic locations, sports, types of businesses, types of products, adjectives or descriptors, topics, etc. A user or an administrator can access the custom dictionary 126 through an administrative computing device to edit the list of tags or category tags. For example, the user can add new tags to the list and/or remove tags from the list through inputs at the administrative computing device. The custom dictionary 126 can be stored in the data storage 130, in some embodiments.

In some embodiments, the custom dictionary 126 can store a mapping of tags to keywords and/or rules. The mapping can be used to identify tags that correspond to natural language queries input into the user interface 110 (e.g., input into the CLI 114). For example, the mapping can include a tag such as "California." The mapping can include the term California and a stored association (e.g., a presence in the same row or another mapping indicator) that indicates that the tag California corresponds to the keyword "California" and the key phrases "the golden state" and "west coast state." Tags can be mapped to any number of keywords and/or key phrases. The tag California can additionally or instead be mapped to one or more rules, such as "the natural language query identifies seven different words that correspond to California." Tags can be mapped to any number of rules.

In some cases, the tags can each be mapped to one or more embeddings. For example, the query analyzer 121 can generate an embedding from the natural language query. The query analyzer 121 can compare the embedding to the embeddings of the mapping to determine a similarity (e.g., a cosine similarity) between the natural language query and each embedding of the mapping. The query analyzer 121 can identify any similarities that exceed a threshold (e.g., a predefined threshold) and assign the tags mapped to the embeddings with the similarities exceeding the threshold to the natural language query. The query analyzer 121 can generate an embedding and perform such a comparison and assignment for each character input for the natural language query, responsive to detecting a natural language query has been completed, and/or responsive to selection of a submit button.

In some cases, the custom dictionary 126 can store separate lists and/or mappings for different organizations. For example, the custom dictionary 126 can store lists and/or mappings in data structures that are separate for different organizations. For example, administrators of different organizations can have permissions to access and/or modify a list and/or mapping for their respective organizations, but not any other organizations. The AI engine 120 can use the lists and/or mappings to identify tags for natural language queries originating from and/or otherwise associated with users of different organizations and/or group entities. The AI engine 120 can store separate mappings for different indices of different organizations and/or for different indices for the same organization.

The document parser 123 can be configured to generate the sets of data 138 in the data storage 130. The sets of data 138 can be or included unstructured sets of data (e.g., sets of data generated from unstructured documents) or data that was extracted from unstructured documents. The document parser 123 can generate the sets of data 138 from documents that have been uploaded to the system 100. Such documents may have been uploaded as digital documents in formats such as PDFs, JPEGs, TIFFs, etc. For example, the system 100 can receive a digital document (e.g., a digital copy or a digital version of a document) in a data file from a computing device. The document parser 123 can use natural language processing techniques and/or object recognition techniques to extract data from the document. The document parser 123 can store the extracted data in a record for the document. The document parser 123 can store the record in the sets of data 138 as a set of data. The document parser 123 can similarly generate records in the sets of data 138 for any number of documents. In some cases, the document parser 123 can generate one or more embeddings for each document and store the embeddings in the records for the documents to facilitate data retrieval using the large language models 122.

In some embodiments, the document parser 123 can store the data of documents in a record in separate segments (e.g., segments of a table). For example, when extracting the data from a digital document, the document parser 123 can separate different types of data from the document based on the format of the data and/or breaks in the data. For instance, the document parser 123 can store paragraphs separate from each other and further store tables separate from the paragraphs. In doing so, the document parser 123 can generate a structured dataset with the different segments each corresponding to a different identifier (e.g., segment identifier). The segments can each include or correspond to a document identifier of the document from which the data of the segments was extracted. The document parser 123 can generate an embedding from each segment with the data of the respective segments. The document parser 123 can store the embeddings in the segments themselves or in a separate location of the record for the set of data for the document. In storing the data of the document in this way, the document parser 123 can facilitate faster and/or less resource intensive data retrieval when the large language models 122 query the sets of data 138 for data to use to generate responses to natural language queries.

For example, the document parser 123 can generate a set of data for a document (e.g., a digital document). The document parser 123 can do so by identifying different types of data that are included in the document. For instance, the document parser 123 can identify individual tables, paragraphs, sections, graphs, etc., from the document. The document parser 123 can identify such data using object recognition techniques on the documents. The document parser 123 can extract or identify each separate type of data. The document parser 123 can generate a set of data for the document by storing the extracted data in separate segments each corresponding to a different part or section of the document (e.g., a table can be stored in one segment, a first paragraph can be stored in another segment, a second paragraph can be stored in another segment, etc.). Each segment can have a separate segment identifier identifying the segment and/or a document identifier of the document. The document parser 123 can store the segments in a record (e.g., a file, document, table, listing, message, notification, etc.) containing all of the data of the document. The record can be or contain the set of data for the document. The document parser 123 can store the record in the sets of data 138 of the data storage 130. The document parser 123 can similarly store sets of data in records for any number of documents. By segmenting individual documents in this way, the large language models 122 can more efficiently query the sets of data 138 compared to systems that store the documents themselves, such as because the segments can be structured in a manner that is more easily queried (e.g., in a table or in a manner in which data can be retrieved using a structured query language (SQL) query).

In some cases, to increase the accuracy of the data retrieval from tables (e.g., tables extracted from unstructured documents), the document parser 123 can include contextual data in segments for individual tables of the document. For example, the document parser 123 can segment the data of documents according to a set of rules. The set of rules can be or include rules indicating how to combine or chunk data, how to combine one or more paragraphs into a single segment, and/or combinations of different types of data to store in individual segments. One example of a rule is to store tables with paragraphs that immediately precede and/or are after a table with the table itself in the same segment. For instance, the document parser 123 can identify a table from a document and then parse any content immediately above or below the table in the document to determine whether there is a paragraph above or below the table. Responsive to identifying a paragraph above and/or below the table, the document parser 123 can include the identified paragraph or paragraphs in the same segment as the table. In cases in which the document parser 123 stores separate portions of tables in separate segments, the document parser 123 can similarly store the first row, or the row with the headings of the table, in each of the segments for the table. In doing so, the document parser 123 can generate segments that are less resource-intensive for the large language models 122 to process when querying the sets of data 138. For instance, the large language models 122 may be able to determine a context of the table based on a paragraph or paragraphs in the individual segments and use the context to determine the meaning or relevance of the data in the individual rows of the table. Similarly, the large language models 122 can use the heading or first row of the table in the segment to determine the context or content of cells of rows in the columns of the headings. Accordingly, the large language models 122 can more accurately retrieving data from tables to reduce hallucinations when generating responses to natural language queries.

The document parser 123 can be configured to tag or assign tags (e.g., category tags) to the individual sets of data 138. The document parser 123 can do so using natural language processing techniques. For example, the document parser 123 can identify and/or extract the text and/or the different objects (e.g., paragraphs, tables, images, etc.) contained in different documents. The document parser 123 can process the extracted data to identify different keywords from the text and/or objects (e.g., such as by using object recognition techniques). The document parser 123 can apply one or more rules to keywords and/or identified objects that correspond to tags of the custom dictionary 126. For instance, a rule can be satisfied by a specific combination of keywords and/or objects that are identified from a document. The document parser 123 can identify a tag that corresponds to the satisfied rule. The document parser 123 can identify any number of tags for a document in this manner. The document parser 123 can store the documents, or sets of data generated from the documents, in the data storage 130 as the sets of data 138. The document parser 123 can include any tags assigned to the documents in the sets of data 138 generated from the respective documents.

The tags can be the same as the tags in the mapping of tags of the custom dictionary 126 that the query analyzer 121 uses to tag natural language queries. For instance, the document parser 123 can generate or determine tags for documents using rules of a mapping between rules and the tags. The document parser 123 can store the tags in sets of data generated for the documents. Subsequently, the query analyzer 121 can determine tags for a natural language query input at the user interface 110. The large language models 122 can identify sets of data that have been assigned to the same tags as the natural language query and query the identified sets of data to generate a response to the natural language query.

In some cases, the data storage 130 can include the structured data 139. The structured data 139 can include data that is stored in a structured format, such as in tables, CSV files, or spreadsheets or that is otherwise extracted from structured files or files that only contain structured data. The structured data 139 can be or include uploaded files and/or data that the document parser 123 extracts from the files containing (e.g., only containing) structured data (e.g., tables or spreadsheets extracted from files containing the tables or spreadsheets). The structured data 139 can be or include a relational database, such as a relational standard query language (SQL) database. In one example, the document parser 123 can clean and normalize data in files containing structured data (e.g., only containing) received by the AI engine 120. The document parser 123 can insert the cleaned and normalized structured data (e.g., as tables or spreadsheets) in a database or data structure, such as an SQL database. The document parser 123 can store another table in the data storage 130 that includes or holds a reference mapping (e.g., a file reference to newly created or stored tables of the structured data 139) for each table within a particular index (e.g., of the structured data 139). The other table can be a schema table which can store table references (e.g., references or identifiers of tables or spreadsheets of the structured data 139), file references to the tables, and/or summaries or descriptions of the content of the tables along with the types of the data included in the respective tables. This schema information can aid in the retrieval process to identify which tables are relevant to a natural language query, which is helpful for scalability when dealing with a large number (e.g., thousands) of tables, such as because it may not be feasible to send schema information of all tables to large language models 122 that generate SQL queries.

In some cases, the document parser 123 can extract the tables from unstructured documents and insert the tables into the structured data 139. For instance, the document parser 123 can identify a table from an uploaded electronic document. The document parser 123 can extract the table from the electronic document and insert the table into the structured data 139. The document parser 123 can additionally update the schema table to include data about the extracted table such as an address of the table in memory, a description of the content of the table (which the document parser 123 may determine by processing the table using the large language models 122, for example), a format of the table, etc. The document parser 123 can insert the table in the structured data 139 in addition to or instead of including the table in the sets of data 138. By doing so, the document parser 123 can make identifying relevant data from the table easier during the data retrieval process.

The training module 140 can be configured to train the AI models used within the AI engine 120. The training module 140 can include a dataset manager 142 that manages and/or configures the organization, selection, and preprocessing of training data stored in the data storage 130. The training module 140 can include a model trainer 144, which can be configured to execute the training process of the AI models of the AI engine 120 to update the AI models using techniques such as supervised learning, unsupervised learning, or reinforcement learning. Once trained, the updated models can be stored back into the AI engine 120 for use in content generation (e.g., for generating responses to natural language queries).

The system control module 150 can be configured to control the overall operation of the generative AI computing system 100. The system control module 150 can include an access control unit 152, which can restrict access to the system 100 based on user roles and permissions. The system control module 150 can also include a monitoring unit 154 that tracks system performance and user interactions, such as generating logs that can be reviewed for system optimization and troubleshooting. The system control module 150 can include an update manager 156 that oversees the deployment of software updates, including improvements to the AI engine 120 and the user interface 110.

During operation, a user can interact with the generative AI computing system 100 through the user interface 110. For instance, in a text generation scenario, the user may access a client device presenting the user interface 110, which may be generated by the generative AI computing system 100. At the user interface 110, the user can input a natural language query in a prompt via the GUI 112 or the CLI 114. The GUI 112 and/or the CLI 114 together, or separately, can be or include a chat interface of the user interface 110. Responsive to a selection of a submit button (e.g., a submit button presented on the user interface 110), the client device can transmit the input prompt to the AI engine 120 (e.g., transmit the input prompt to the AI engine 120 hosted and/or processed on a separate computing device). The AI engine 120 can process the prompt using the large language models 122 (e.g., using one or more large language models of the large language models 122) to generate a text output or a response to the natural language query. The generated response can be displayed or presented on the user interface 110 for review. The user may provide feedback or request modifications with one or more inputs into the user interface 110. The AI engine 120 can process such feedback and/or requested modifications using the content refinement module 124 to generate an updated output. The system 100 can continually learn from user interactions, such as by storing preferences of individual users or users sharing one or more characteristics in the data storage 130 and/or updating the AI models of the AI engine 120 using the training module 140.

In some cases, the user interface 110 enables the user to provide terms for the custom dictionary 126 and to define tags (e.g., field-specific domains) for user queries. Upon the AI engine 120 receiving a natural language query and one or more tags from a user interface, the AI engine 120 can identify or determine the one or more tags. In some embodiments, users can select key terms from the custom dictionary 126 in the user interface 110. The AI engine 120 can identify one or more sets of data 138 from the data storage 130 that correspond with the one or more tags. The AI engine 120 can query the identified one or more sets of data 138 based on the natural language query to generate a response to the natural language query received at the user interface 110. In performing this process, the AI engine 120 can use the toolbox module 128 to provide feedback on queries, structure queries, and/or refine follow-up queries. Examples of how the toolbox module 128 can be used are further described with reference to FIG. 12.

In a non-limiting example, a client device being accessed by a user can establish a connection with the system 100. Through the connection, the system 100 can present the user interface 110 comprising the GUI 112 and/or the CLI 114 at the client device. The user can input a natural language query requesting data regarding one or more of the sets of data 138 into the CLI 114. As the user inputs the natural language query, or after inputting the natural language query and selecting a submit button, the AI engine 120 can use the query analyzer 121 to analyze the input. In doing so, the query analyzer 121 can execute or apply one or more rules to identify one or more keywords and/or one or more contexts from the input into the CLI 114. The query analyzer 121 can compare keywords and/or contexts to the mapping of tags to keywords and/or rules of the custom dictionary 126 to identify one or more tags that correspond to the keywords and/or the satisfied rules. The query analyzer 121 can automatically update a form in the CLI 114 with the identified tags.

When the query analyzer 121 uses the custom dictionary 126 to identify one or more tags for a natural language query, the query analyzer 121 can identify the organization associated with the natural language query (e.g., based on access permissions a user that input the natural language query has with the system 100). For example, the system 100 can provision or transmit the client device a web token upon authenticating the user accessing the client device to provide the user interface 110. The web token (e.g., a JavaScript Object Notation (JSON) web token) can indicate the access permissions of the user, such as the organization or group entity associated with the user. The client device can transmit the web token to the system 100 with the natural language query in a message, such as by including the web token in an authorization header of the message (e.g., in an HTTP request). The query analyzer 121 can select a list or mapping of tags of the organization of the user from the custom dictionary 126 based on the web token. The query analyzer 121 can use the selected list or mapping to identify one or more tags for the natural language query.

The user accessing the client device can view the tags determined and populated by the query analyzer 121 into the form. The user can provide inputs to remove one or more of the tags from the form and/or to add one or more new tags to the form. In some embodiments, the AI engine 120 can present a list of tags at the user interface 110 (e.g., on the GUI 112). The user can select one or more tags to add to the form containing the tags from the list of tags. The user can select a submit button on the user interface 110 to cause the client device to transmit the natural language query and the one or more tags to the AI engine 120 (e.g., the computing device executing and/or hosting the AI engine 120).

The AI engine 120 can use the large language models 122 to generate a response to the natural language query. The AI engine 120 engine can generate the response by querying data in sets of data 138 that is relevant for generating a response to the natural language query. In doing so, the AI engine 120 can first use a first filtering technique to identify a subset of the sets of data 138. For instance, the AI engine 120 can generate an input prompt indicating to generate a query into the sets of data 138 for sets of data that have been tagged with the tags the AI engine 120 received from the user interface 110. The AI engine 120 can execute the large language model using the input prompt to cause the large language model to generate a first query into the sets of data 138. The AI engine 120 can use an application programming interface (API) to execute the first query within the sets of data 138 to identify one or more sets of data tagged with category tags matching (e.g., identically matching) the tags transmitted to the AI engine 120 with (e.g., and separate from) the natural language query. The AI engine 120 can retrieve the identified sets of data as a subset of the sets of data 138 that include data that is relevant to generating a response to the natural language query.

Subsequent to retrieving the subset of the sets of data, the large language models 122 (e.g., the same large language model that generated the first query to retrieve the subset of the sets of data or a different large language model) can use the natural language query to retrieve relevant data from the retrieved subset of the sets of data. The large language models 122 can do so, for example, by generating a second query using the natural language query as input. In some cases, the large language models 122 can identify the schemas of the respective sets of data of the subset and generating the second query in a schema that can be used to retrieve data from the respective subset of the sets of data 138. In some cases, the large language models 122 can generate an embedding from the natural language query and compare the embedding to embeddings of the subset of the sets of data 138 to identify information that is similar (e.g., similar above a threshold) to the embedding for the natural language query. The large language models 122 can retrieve (e.g., using an API) the relevant data (e.g., as response data) for generating a response to the natural language query using the second query.

In some cases, the large language models 122 can perform a dual search to retrieve response data from the data storage 130. The dual search can involve performing one retrieval operation from the sets of data 138 (e.g., the unstructured data of the sets of data 138) and another retrieval operation from the structured data 139. The large language models 122 can perform the retrieval operation from the sets of data 138 as described herein, such as by parsing tags from the natural language query, using the parsed tags to identify a subset of data from the sets of data 138, and retrieving the relevant data from the subset of data.

The large language models 122 can perform the second retrieval operation from the structured data 139. The large language models 122 can do so, for example, by identifying tables, spreadsheets, or other types of data structures of the structured data 139 that are relevant to generating a response to the natural language query from the schema table. For instance, the large language models 122 can identify column names, data types, and/or descriptions or indications of the content of different tables or data structures of the structured data 139. The large language models 122 can determine a content or context of the natural language query and compare the content or context with the data for the different tables identified in the schema table. Based on the comparison, the large language models 122 can identify one or more (e.g., a defined number) of tables with the highest similarity (e.g., highest similarity score). The large language models 122 can input information about the identified tables (e.g., the columns, the dimensions, the data types, etc.) from the schema table or otherwise from the training of the large language models 122 into a query generation machine learning model. The query generation machine learning model may be configured or trained to generate database queries (e.g., SQL database queries) based on queries and/or definitions of relevant tables. The query generation machine learning model may be a large language model, a neural network, a support vector machine, etc. The large language models 122 can input the information about the identified tables and/or the natural language query into the query generation machine learning model and execute the query generation machine learning model to generate one or more SQL queries for each of the identified tables. The large language models 122 can execute the SQL queries to retrieve data that is relevant to generating a response from the relevant tables.

In some cases, the large language models 122 may determine whether to query the sets of data 138, the structured data 139, or both, to generate a response. For example, the large language models 122 may be trained or otherwise use a set of rules to process natural language queries to determine types of data that may be required or otherwise may be used to generate a response. For example, the large language models 122 may receive a request for a value or characteristics of a particular animal. The large language models 122 may determine only a query of the structured data 139 is necessary or otherwise only to perform a query from the structured data 139 because the value is or is likely to be in a table. Based on the determination, the large language models 122 may only perform a query of the structured data 139 to retrieve response data to use to generate a response to the request (e.g., the natural language query). In another example, the large language models 122 may receive a request for a description about a location in another country. The large language models 122 may determine only a query of the sets of data 138 is necessary or otherwise only to perform a query from the sets of data 138 because the response will be descriptive in nature rather than include one or more specific values. Based on the determination, the large language models 122 may only perform a query of the sets of data 138 to retrieve response data to use to generate a response to the request (e.g., natural language query). In another example, the large language models 122 may receive a request for a description of the best team in baseball. The large language models 122 may determine to query both of the sets of data 138 and structured data 139 because the response will be descriptive in nature including adjectives and/or opinions about a baseball team and may include statistics about the baseball team in the explanation. Based on the determination, the large language models 122 may query both the sets of data 138 and the structured data 139 to retrieve response data to use to generate a response to the request (e.g., natural language query).

In some cases, the large language models 122 may iteratively determine whether to query the different data sources. For example, in response to a request, the large language models 122, may perform a first query of the sets of data 138 to retrieve a first set of response data. The large language models 122 can determine whether the first set of response data is responsive (e.g., fully responsive or fully answers) to the request. Responsive to determining the first set of response data is responsive to the request, the large language models 122 may generate a response based only on the first set of response data. However, responsive to determining the first set of response data is not responsive to the request, the large language models 122 may query the structured data 139 to retrieve a second set of response data. The large language models 122 can use one or both of the retrieved sets of response data to generate a response to the request. In some cases, the large language models may determine the order in which to perform the queries based on the context of the request, as described above.

The large language models 122 can generate a data structure with the response data. In doing so, the large language models 122 can insert response data retrieved from one or both of the sets of data 138 and/or the structured data 139. The large language models 122 can generate the data structure to have a format of a vector, a database, a JSON object, a structure object, a non-structured format, etc. The large language models 122 can process the data in the data structure to generate a response to the natural language query. In doing so, the large language models 122 can generate the response to include the requested data and/or a format identified in the natural language query (e.g., a table, slide deck, image, etc.). The response can include a summary, a report, brief bullet points, or any other type of response or visual representation of the data structure that is relevant to the natural language query.

The AI engine 120 can present the response at the client device on the user interface 110 (e.g., at the GUI 112). The response can be a visual representation of the data structure generated based on the second query. Because of the two-stage querying technique, the AI engine 120 can generate a response to the natural language query from the client device while reducing hallucinations in the accuracy of the response.

In a non-limiting example, an organization can include an administrator that is responsible for user management and access control. The administrator can generate multiple indices in the custom dictionary 126 with a different set of tags for each index for the organization. Each set of tags can correspond to a particular dataset containing sets of data for uploaded documents. For example, tags for a particular index can be used to query sets of data only in the sets of data associated with the index. The indices can differ in their tags (e.g., an index of books may have author and genre as tags, while an index of emails can have sender and receiver as tags). The administrator can add or remove tags from each of the indices.

The administrator or users of the organization can upload files containing documents to specific indices (e.g., indices selected by the administrator or the users performing the uploading) through an upload interface provided by the system 100. The AI engine 120 can generate sets of data from the individual documents or files and add the sets of data to the indices (e.g., indices selected by the administrator or users) in the sets of data 138. The AI engine 120 may only store sets of data in the indices selected by the administrator and/or users. The AI engine 120 can use the tags of the indices for which the documents or files were uploaded to tag the sets of data 138 with tags in the indices in the custom dictionary 126, such as based on the content of the respective documents. The administrator or users can update, add, and/or change the tags for the individual sets of data.

After the documents have been uploaded to the data storage 130 as the sets of data 138 tagged with tags from the custom dictionary 126, a user can view the user interface 110. The user can provide input a natural language query into the user interface 110. The user may do so, for example, after selecting an index of sets of data to use to generate a response. The user may be limited to only being able to select an index that corresponds to the organization of which the user is a part. For instance, the AI engine 120 can identify the organization of the user, such as based on a web token provided by the client device the user is accessing or the account with the system 100 through which the user is accessing the user interface 110. The AI engine 120 can present a list of indices that correspond to the organization. The user can select one or more indices from the list. Subsequent to doing so, the user can input the natural language query.

The AI engine 120 can tag the natural language query. The AI engine 120 can tag the natural language query using the tags of the selected index. For instance, the AI engine 120 can identify keywords or entities of the natural language query and populate forms of the user interface 110 with tags of the selected indices that contain the keywords or entities. The user can view the tags and adjust the tags as desired. The user can select a submit button to cause the client device to transmit the natural language query with the tags to the AI engine 120.

The AI engine 120 can identify a subset of the sets of data 138. The AI engine 120 can identify the subset of the sets of data that each contain or correspond to at least one tag that matches at least one tag generated or identified for the natural language query. In doing so, the AI engine 120 may only search the sets of data that correspond to the selected index or indices, thus reducing the querying that may be required for the filtering. For instance, the AI engine 120 may identify the sets of data of the index based on identifiers of the index within or that correspond to the sets of data within the index (e.g., the sets of data may each include one or more identifiers of indices to which the sets of data correspond). The identifiers of indices in the sets of data 138 can be the same as or match the identifiers of the indices in the custom dictionary. The AI engine 120 can identify sets of data of the index that the user selected when inputting the natural language query (e.g., an identifier for which may be included in the message containing the natural language query and/or the tags for the natural language query).

The AI engine 120 can identify a subset of the sets of data of the index with at least one tag that matches at least one tag of the natural language query. The AI engine 120 can query the subset of the sets of data to retrieve data that is relevant to generating a response to the natural language query. The AI engine 120 can generate a response using the retrieved data. The AI engine 120 can present the response on the user interface 110. In some cases, the AI engine 120 can include pointers to specific parts or pages of documents from which data was extracted or used to generate the response. The AI engine 120 can do so in multiple file formats.

At any point of the query/chat process, the user can select an option to export the thread between the user and system 100 that contains one or more natural language queries and/or one or more responses to such natural language queries. The AI engine 120 can additionally log or store such threads for future use (e.g., to provide context for generating a future response).

Figure 2:
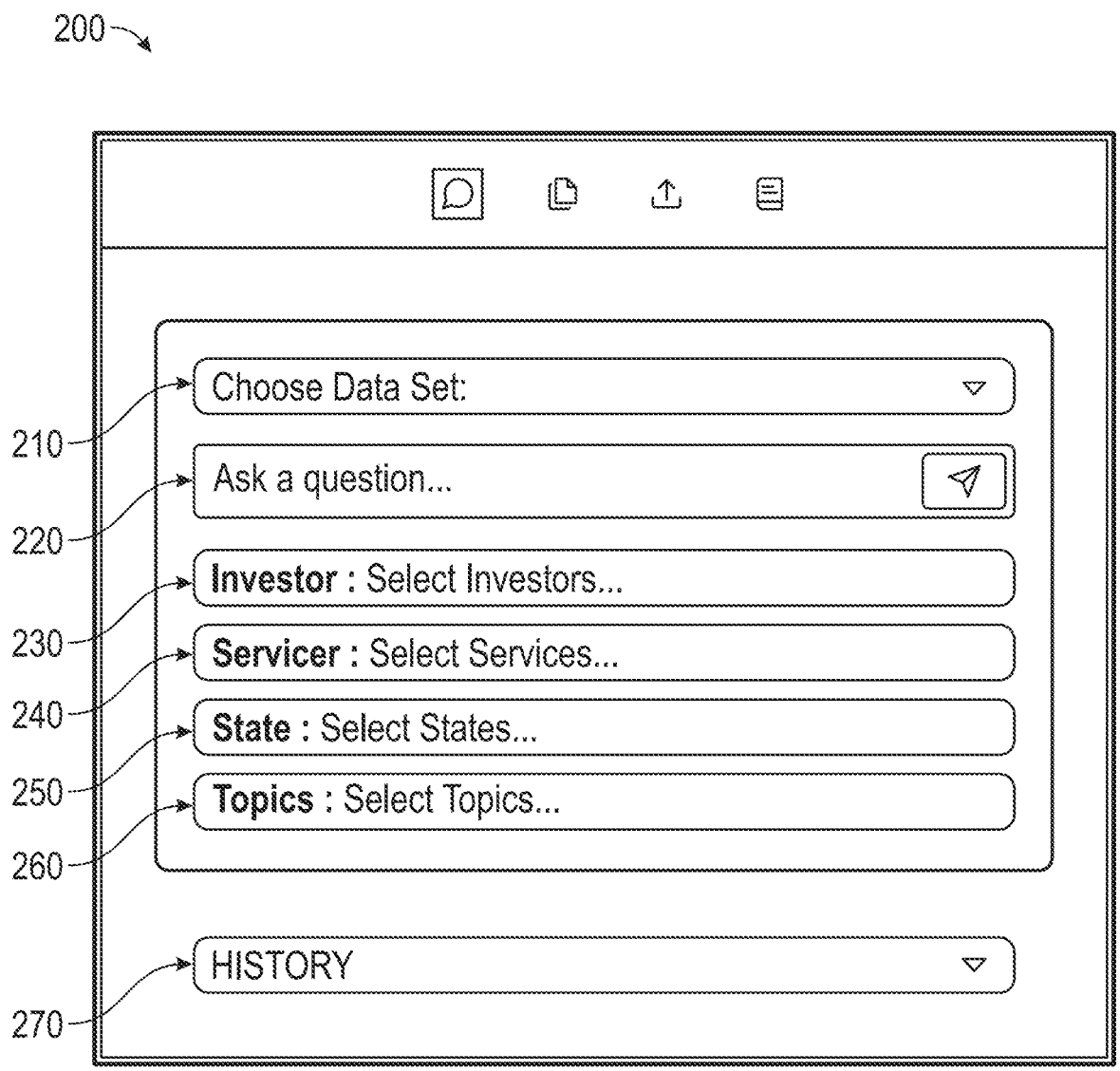
FIG. 2 is an example graphical user interface (GUI) in the system of FIG. 1, according to some implementations.

FIG. 2 is an example graphical user interface (GUI) 200 depicting a configuration of inputs for a generative AI computing system. Different GUIs may include additional, fewer, or different inputs depending on the embodiment. GUI 200 includes a data set selection menu 210, a text box 220, selection boxes 230, 240, 250, and 260, and a drop-down menu 270. Selection box 230 enables the user to select from a list of inventors. Selection box 240 enables the user to select from a list of servicers. Selection box 250 enables the user to select from a list of states. Selection box 260 enables the user to select from a list of topics. The selections made in selection boxes 230, 240, 250, and 260 can impact the field-specific domain used in generating a query response.

Figure 3:
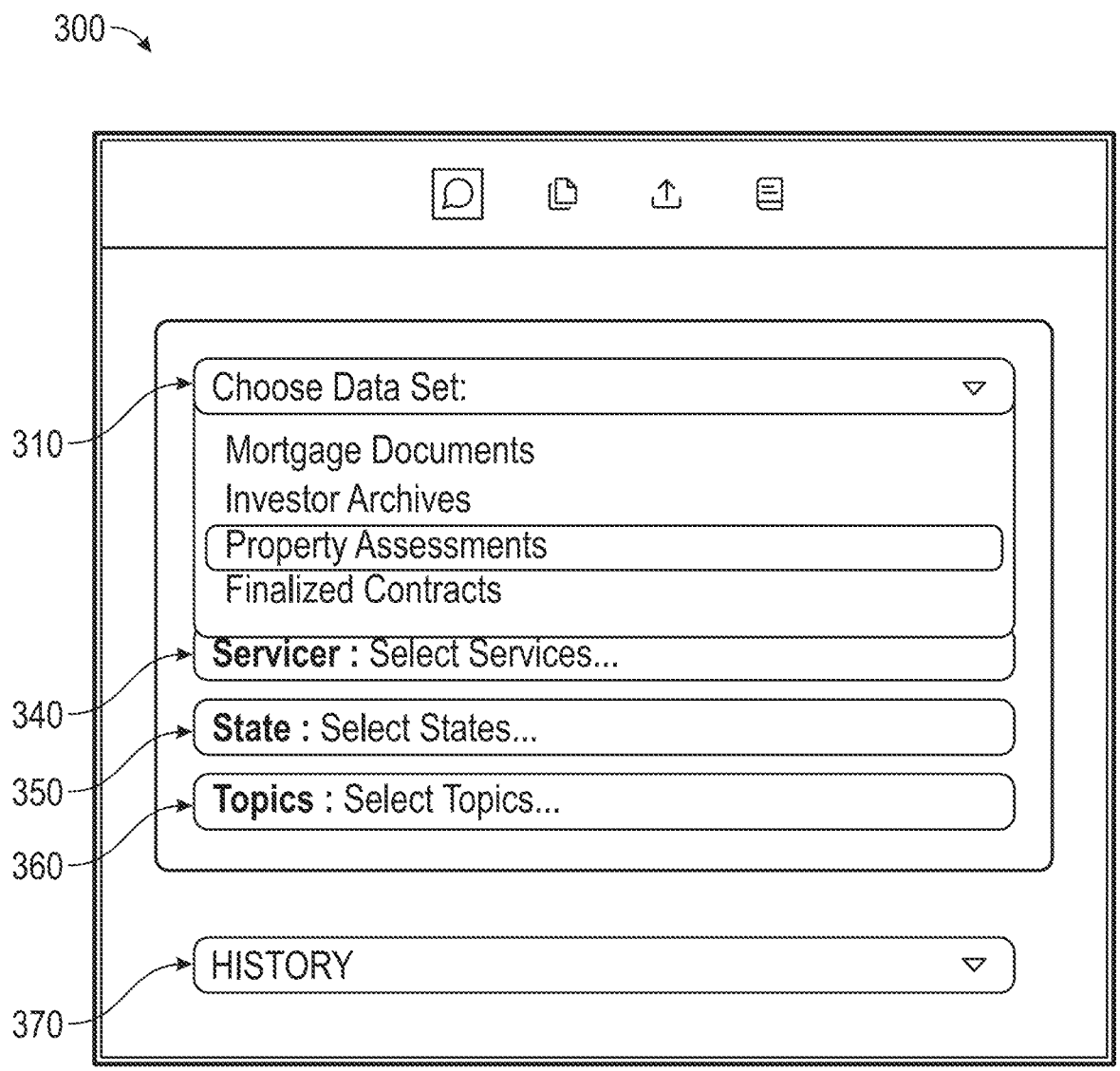

FIG. 3 is another example graphical user interface (GUI) 300 depicting a configuration of inputs for a generative AI computing system. Different GUIs may include additional, fewer, or different inputs depending on the embodiment. GUI 300 includes a data selection menu 310 with a drop-down menu of options. GUI 300 also includes selection boxes 330, 340, 350, and 360, and a drop-down menu 370.

Figure 4:
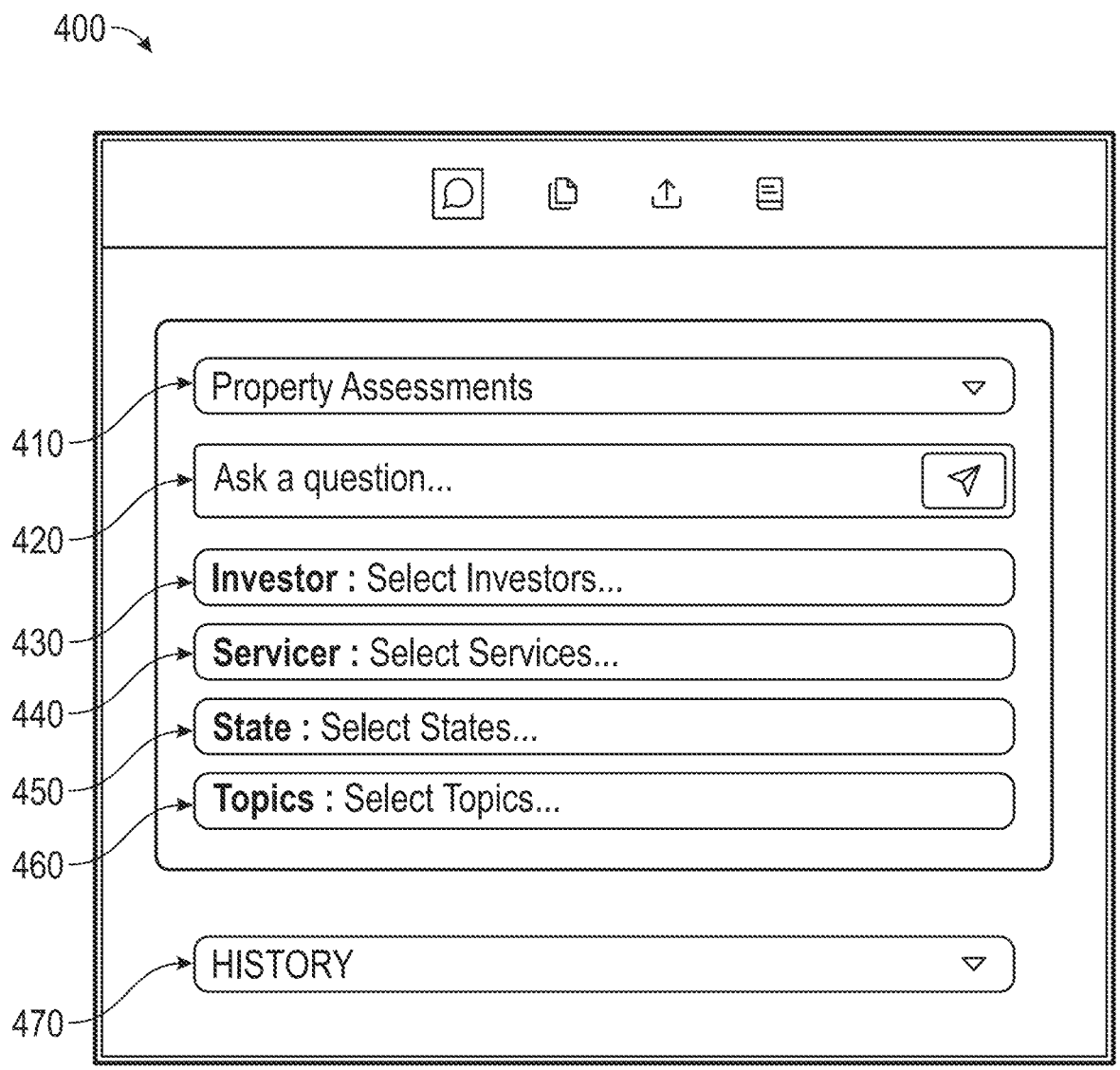

FIG. 4 is another example graphical user interface (GUI) 400 depicting a configuration of inputs for a generative AI computing system. Different GUIs may include additional, fewer, or different inputs depending on the embodiment. GUI 400 includes a data selection menu 410 with one of the options selected from a drop-down menu of options. GUI 400 also includes a text box 420, selection boxes 430, 440, 450, and 460, and a drop-down menu 470.

Figure 5:
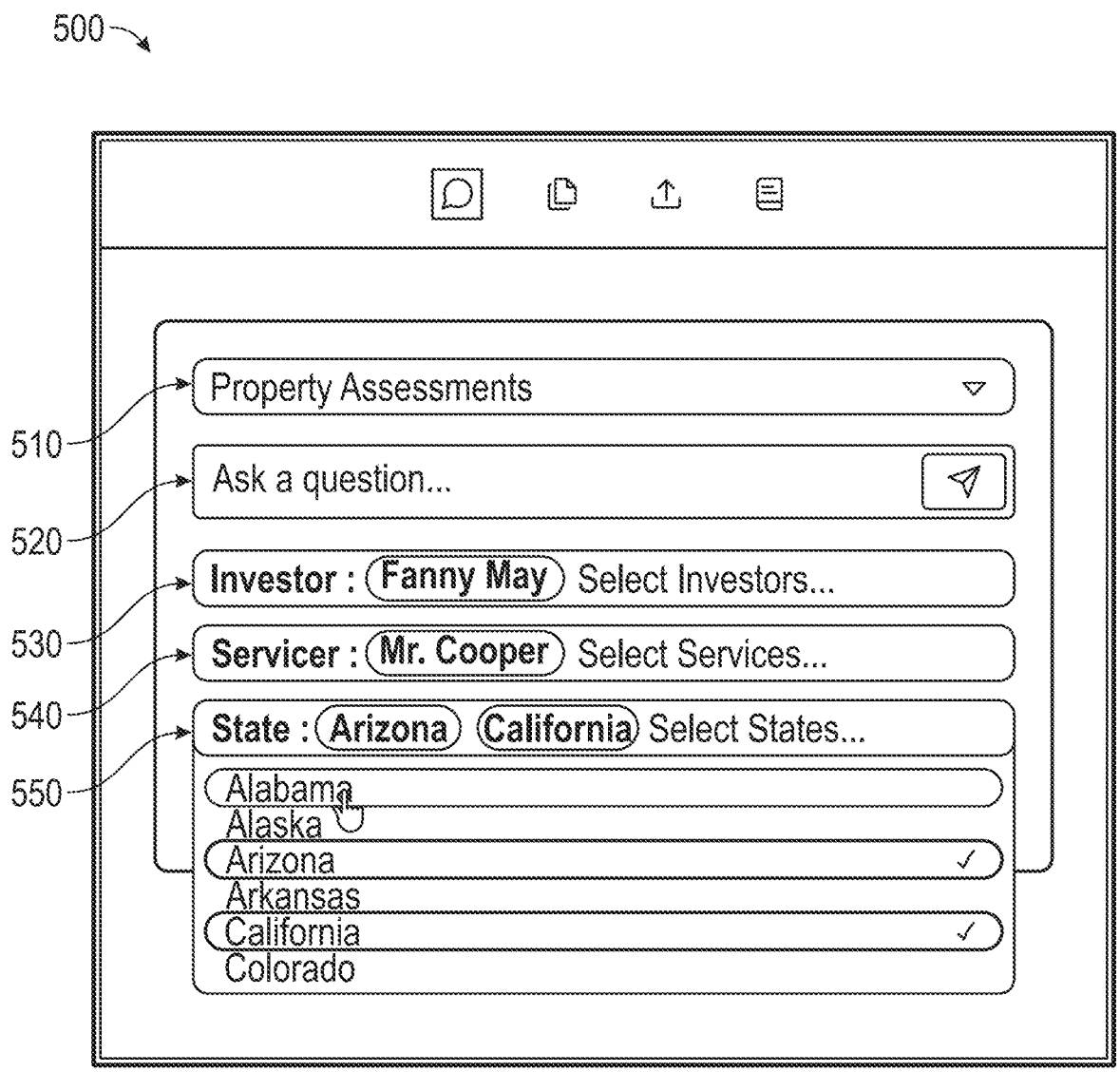

FIG. 5 is another example graphical user interface (GUI) 500 depicting a configuration of inputs for a generative AI computing system. Different GUIs may include additional, fewer, or different inputs depending on the embodiment. GUI 500 includes a data selection menu 510 with one of the options selected from a drop-down menu of options and selection boxes 530, 540, and 550 with context selections made from drop-down menus.

Figure 6:
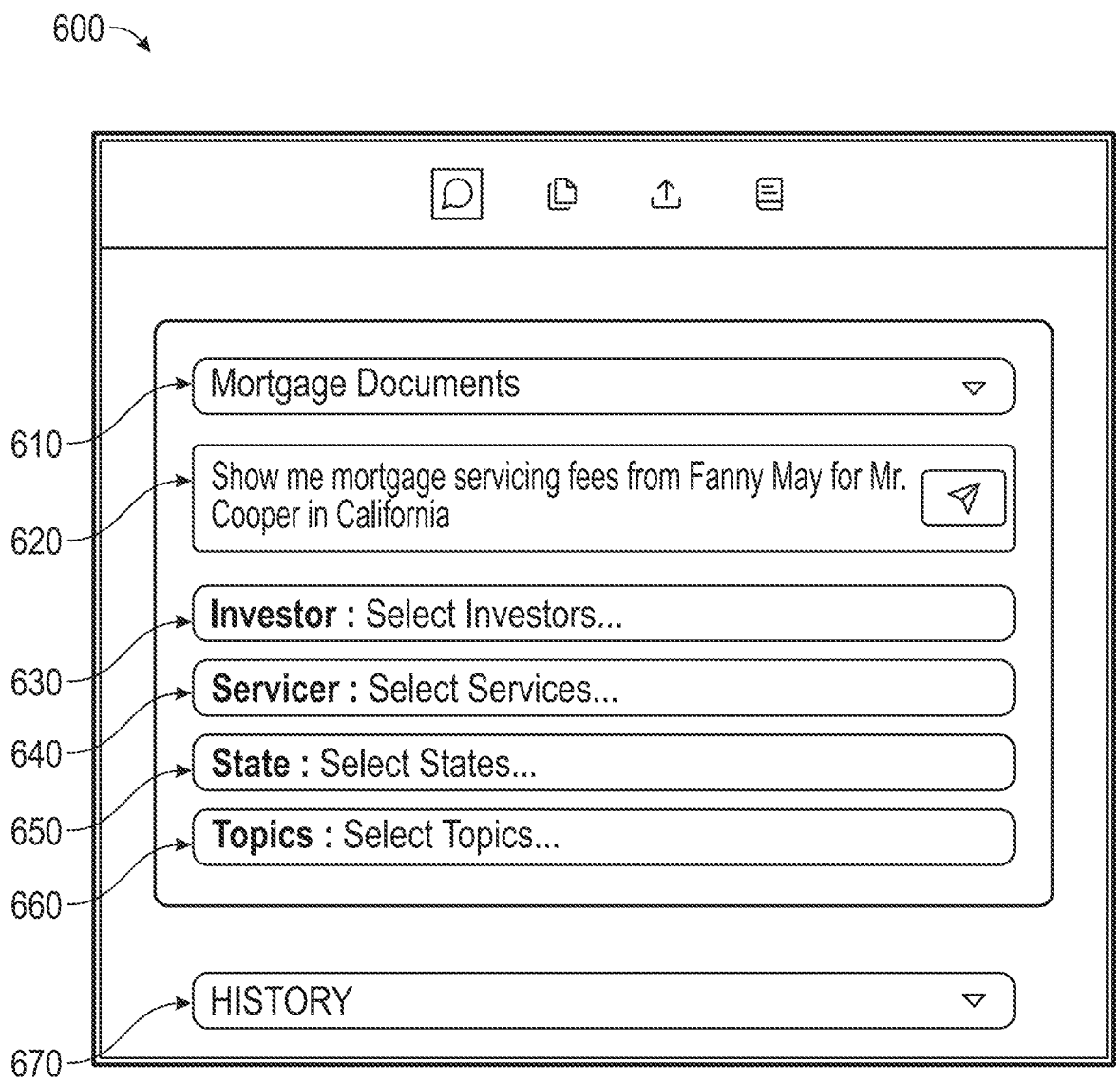

FIG. 6 is another example graphical user interface (GUI) 600 depicting a configuration of inputs for a generative AI computing system. Different GUIs may include additional, fewer, or different inputs depending on the embodiment. GUI 600 includes a query entered into a text box 620. GUI 600 also includes a data selection menu 610, selection boxes 630, 640, 650, and 660, and a drop-down menu 670.

FIG. 7 is an example graphical user interface (GUI) 700 showing a user prompt 710 and a response 720 including references 730. Different GUIs may include additional, fewer, or different responses depending on the embodiment.

Figure 8:
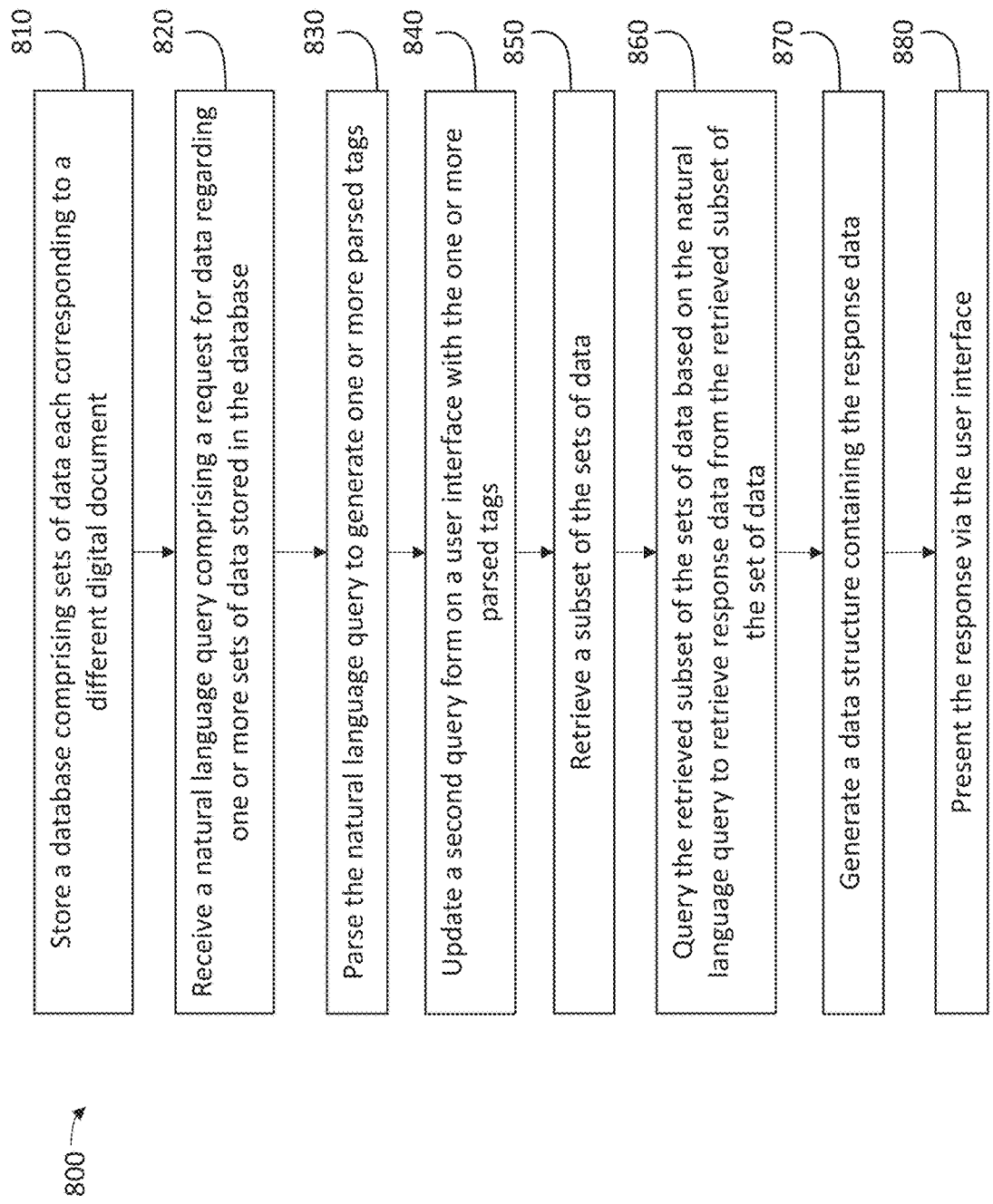
FIG. 8 is a flow chart illustrating example operations of a method of operation of the system of FIG. 1, according to some implementations.

FIG. 8 is a flow diagram of a method 800 for generative machine learning model response generation, according to an example. In some implementations, the method 800 can be performed by a data processing system such as any of the components of the system 100, shown in FIG. 1, or the computing system 1400. The method 800 may include more or fewer operations and the operations may be performed in any order. Performance of the method 800 may enable the data processing system to generate responses to natural language queries that involve a data retrieval step more accurately and more efficiently (e.g., using fewer computing resources) than other response generation techniques involving a data retrieval step using an initial filtering and tagging technique.

In an operation 810, the data processing system stores a database. The database can include one or more sets of data each corresponding to a different digital document. The digital documents may have been uploaded to the data processing system from one or more remote computing devices, such as in one or more files containing the digital documents.

The data processing system can generate the sets of data for the digital documents. The data processing system can do so by segmenting the content of each of the individual digital documents into one or more segments that each contain a different portion of the digital document. For instance, the data processing system can identify different types of data or sections of data from an individual document responsive to receiving, obtaining, and/or identifying the document. The data processing system can do so by using object recognition techniques or natural language processing techniques, for example. The data processing system can group individual sections of the document together into chunks, such as by grouping text of individual paragraphs into separate chunks, including tables in separate chunks, including graphs in separate chunks, etc. Each chunk can be or correspond to (e.g., be stored in) a different segment of the document. The data processing system can store an identifier (e.g., a numerical or alphabetical identifier) in each segment as the segment identifier. The data processing system can store separate segments in a structured data structure, such as a table, one or more arrays, a stack, a queue, a graph, etc. The structured data structure can be or include the dataset or set of data for the document. In some cases, the data processing system can generate and store a different embedding for each segment based on the data of the segment such that the segment can be identified in a query from a large language model.

The data processing system can generate a record containing a set of data for a document, in some cases including a document identifier for the document. For example, the data processing system can automatically generate the document identifier for the document using a sequential order by incrementing a counter from the previously generated document identifier or by identifying a title of the document from the document itself. The data processing system can include the document identifier in the record and/or the set of data for the document. The data processing system can similarly generate records and/or sets of data for any number of documents or digital documents.

In some embodiments, the data processing system can segment the data into sets of data using a set of rules. The rules can include different patterns or rules indicating the types of data to include in different segments of data within the set of data. For example, the set of rules can include a rule to insert separate paragraphs into separate segments of data. Another rule in the set of rules can be a rule that indicates, for each table of a document, the data processing system is to include a paragraph that immediately precedes or is after the table. Such paragraphs can provide context to a large language model querying the individual rows of the table to determine the context of the data in the rows. In some cases, a rule can indicate to separate rows of the same table into different segments. In such cases, the rule can indicate to include the same paragraphs immediately preceding and/or after the table in the segments containing the rows and/or the first row of the table or the row containing the headers for the different columns in the table. The paragraphs and the headers can include contextual data for the contents of the cells in the rows included in the segment. In some cases, such rules can cause data to be duplicated between segments. The set of rules can include any number of rules. The data processing system can execute or use such rules to generate sets of data in records for different documents and store the records in the database.

In some embodiments, the data processing system can assign (e.g., automatically assign) tags (e.g., category tags) to the respective sets of data or the documents from which the data processing system generated the sets of data. The tags can be text strings each containing one or more characters. The tags can indicate the context or contents of the documents or the sets of data. The data processing system can assign the tags to the different documents or sets of data using natural language processing techniques on the documents or sets of data. For example, responsive to receiving a document (e.g., an uploaded document), the data processing system can use natural language processing techniques to parse the text and/or any objects included in the document. In doing so, the data processing system can identify one or more keywords or phrases from the document, the purpose of the document, different topics described in the document, etc. In some cases, the data processing system can identify such data from a set of data generated for a document. The data processing system can compare the data identified from the parsing to a mapping containing tags mapped to such types of identified data. The data processing system can identify that one or more tags that are mapped to any identified keywords or phrases, the purpose of the document, or topics described in the document from the mapping. The data processing system can assign the identified tags to the document, such as by storing the identified tags in the set of data generated for the document and/or the record containing the set of data. The data processing system can assign any number of tags to a document or set of data for a document and/or do so for any number of documents.

In some cases, an administrator or a user can update the tags assigned to documents in the database. For instance, after storing a set of data for a document in the database, a user can access a computing device to view the set of data and/or any metadata of the set of data. The metadata can include the tags assigned (e.g., automatically assigned) to the document or set of data. Through a user interface at the computing device, the user can provide one or more inputs to adjust the tags for the set of data or document. In doing so, the user can remove assigned tags or add assigned tags to the set of data or document. The user can similarly update any number of documents and/or add and/or remove any number of tags from the set of data for the document. Such tags can later be used for data retrieval when generating responses to natural language queries.

In an operation 820, the data processing system receives a natural language query. The data processing system can receive the natural language query from a client device. The data processing system can receive the natural language query from a chat interface (e.g., a first query form of the chat interface) that the data processing system provides to the client device on a platform that the data processing system hosts and/or provides for access by different client devices to respond to natural language queries. The natural language query can be or include a string of text. The natural language query can include or be a request for data regarding the one or more sets of data for the documents that are stored in the database in memory of the data processing system. For example, the natural language query can be a string of text requesting information or data regarding the performance or key performance indicators (KPIs) for a business or organization. The data processing system can receive the natural language query from the client device accessing the platform in a message.

Figure 9:
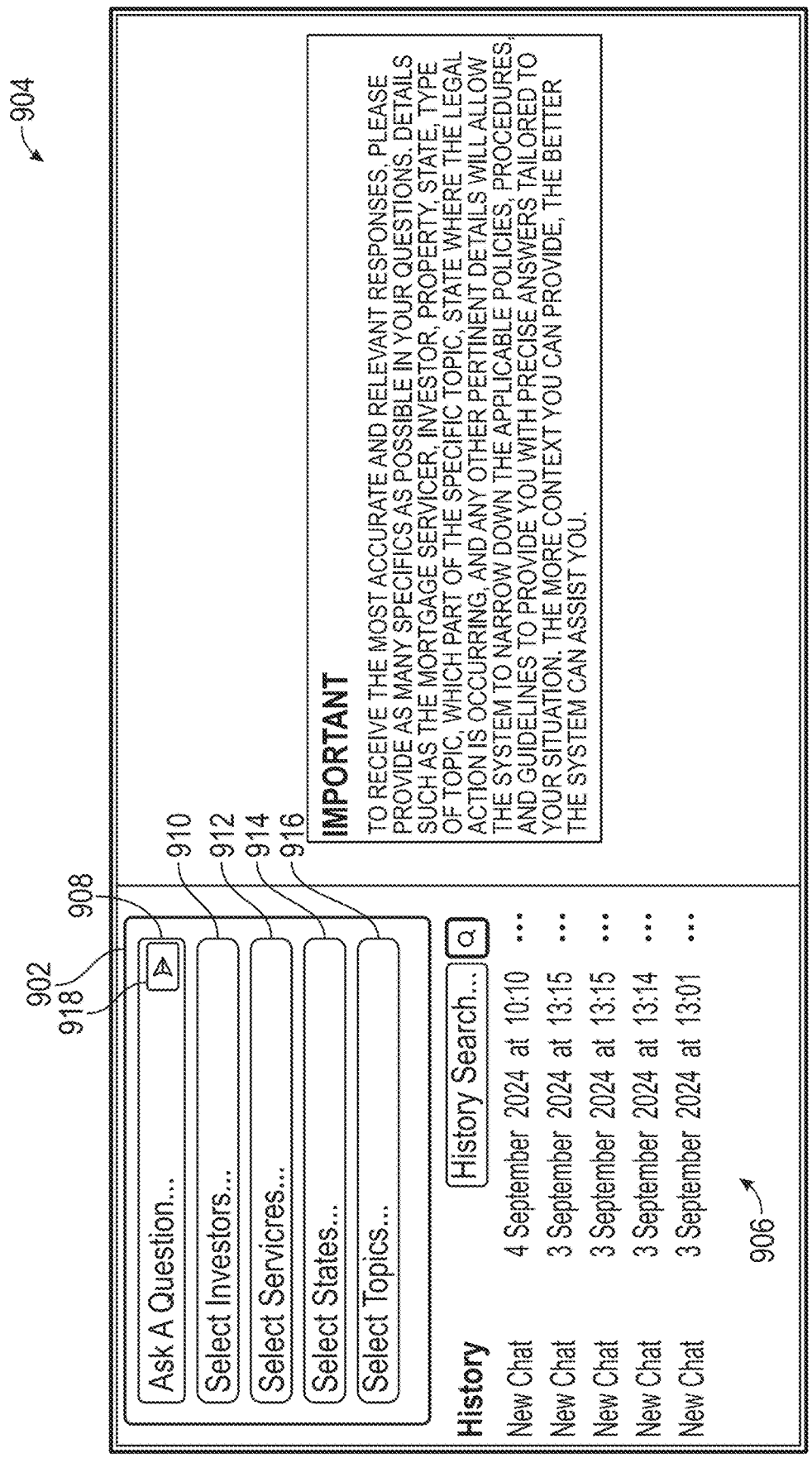
FIGS. 9-11 are example GUIs in the system of FIG. 1, according to some implementations.

For example, referring now to FIG. 9, a user interface 900 is shown. The user interface can include a chat interface 902, a response interface 904, and a chat history 906. The user interface 900 can be displayed at a client device a user can use to access the platform. The user interface 900 can be an interface through which a user can input natural language queries that the data processing system can process to generate responses. The chat history 906 can include one or more identifiers of prior threads of communication between the user (e.g., the account of the user) and the data processing system through the chat interface 902.

For example, the chat interface 902 can include a first form 908 and second forms 910, 912, 914, and 916. The user can input a natural language query into the first form 908 of the chat interface 902. The data processing system can receive the natural language query and generate or identify one or more tags (e.g., category tags) for the natural language query. The data processing system can populate the second forms 910-916 with the generated or identified tags. The user can select a submit button 918 to submit the natural language query before and/or after the data processing system populated the second forms 910-916 with the tags. Responsive to the selection, the client device presenting the user interface 900 can transmit the natural language query from the first form 908, the tags from the second forms 910-916, and/or any threads of messages from the chat history 906 to the data processing system for further processing. In some cases, the user can select a chat from the chat history 906 to view the thread of the selected chat in the response interface 904. The user can submit the natural language query and the client device can transmit the natural language query, any tags, and/or messages of the selected chat to the data processing system to use to generate a response.

Referring again to FIG. 8, in an operation 830, the data processing system parses the natural language query. The data processing system can parse the natural language query with each input (e.g., letter or character) input into the natural language query, responsive to completion of the input of the natural language query, and/or responsive to an input into the chat interface that causes the data processing system to process the natural language query.

When parsing the natural language query, the data processing system can identify or generate one or more tags (e.g., parsed tags). The tags can each indicate a context of the natural language query. Examples of tags can be or include names of groups entities (e.g., organizations, businesses, groups, etc.), geographical locations (e.g., stages, countries, counties, cities, etc.), topics (e.g., accounting, intellectual property, information technology, etc.), servicers, investors, etc. The data processing system can identify or generate the tags using a set of rules. For example, the data processing system can store a mapping of tags to keywords and/or sets or combinations of keywords in a data structure. The mapping can indicate individual keywords or phrases or sets of keywords or phrases that correspond to (e.g., are mapped to) different tags and/or individual or sets of contexts that correspond to different tags. The mapping can be or include a table, for example, in which tags that are mapped to the keywords and/or contexts can be in the same row. The mapping can have any format or configuration. The mapping can include or have identical tags to the mapping used to generate or assign tags for documents uploaded to the data processing system. The data processing system can identify different keywords or phrases determined from a natural language query and compare the identified keywords or phrases to the mapping to identify one or more tags for the natural language query. Similarly, the data processing system can use natural language processing techniques on the natural language query to determine one or more contexts (e.g., the purposes or meanings of the natural language query) for the natural language query. The data processing system can determine or identify tags from the mapping that correspond to the contexts and/or the keywords or phrases to generate or identify tags for the natural language query.

In an operation 840, the data processing system updates a second query form from the user interface. The second query form can include one or more forms configured to display tags determined by the data processing system for a natural language query. The forms can each be configured to present a different type of tag. For example, the second query form can include a form for investor tags, a form for servicer tags, a form for location tags, and a form for topic tags. The data processing system can identify the types of the tags identified for the natural language query, such as from the mapping. The data processing system can present the tags in the respective forms by populating the forms with the tags that correspond to the types of the respective tags.

In some cases, the user accessing the client device can update the tags of the second form. For example, the user can view the tags after the data processing system populated the forms with the tags. The user can provide one or more inputs to remove or add tags to the respective forms.

Figure 10:
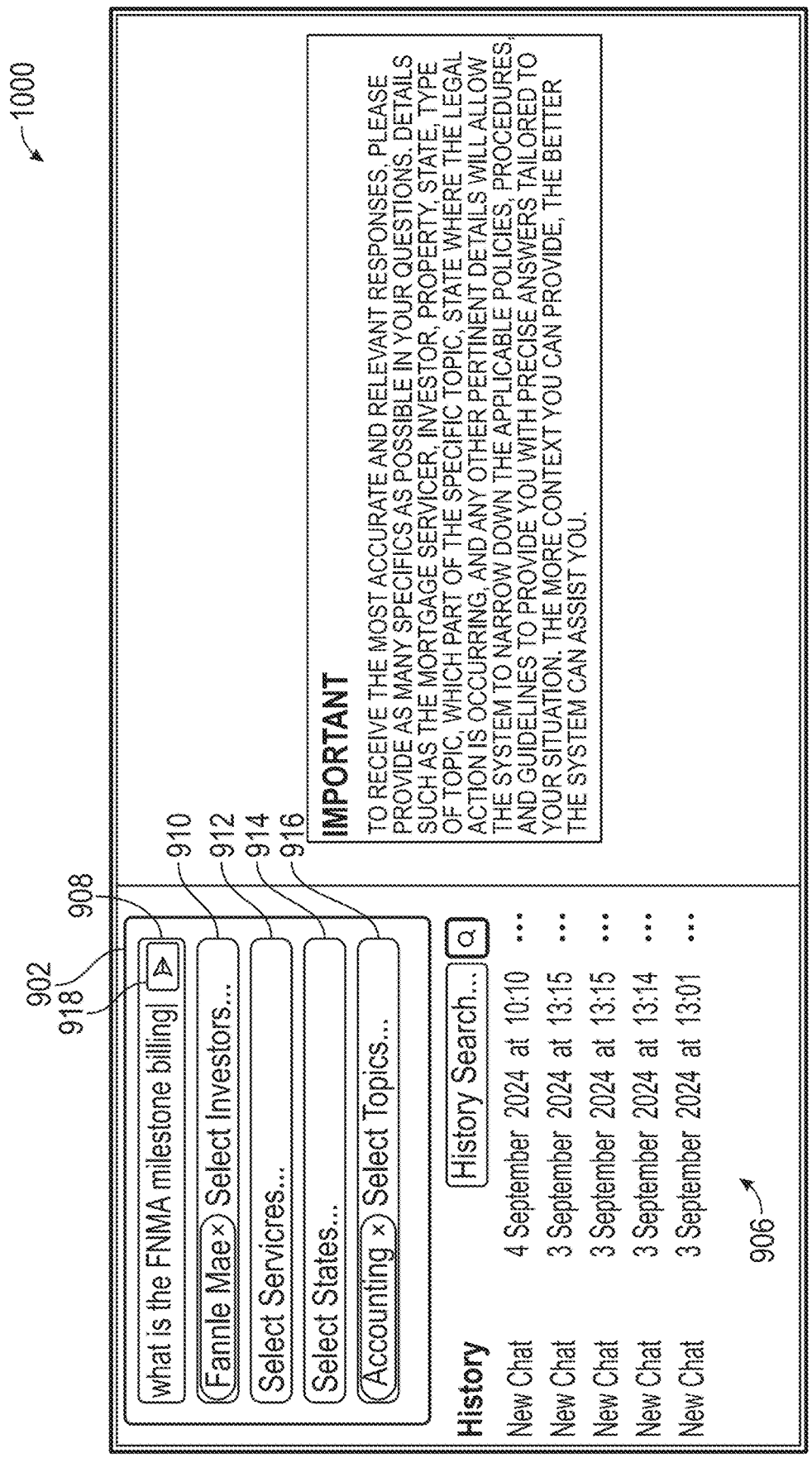

For example, referring now to FIG. 10, a user interface 1000 is shown. The user interface 1000 can be an updated version of the user interface 900, shown and described with reference to FIG. 9, subsequent to the data processing system receiving a natural language query from the first form 908 and populating the second forms 910-916 with tags identified based on the natural language query. For instance, the data processing system can receive (e.g., automatically or based on a selection of the submit button 918) the natural language query "what is the FNMA milestone billing" and identify the tags "Fannie Mae" and "Accounting." The data processing system can determine the Fannie Mae tag corresponds to an investor tag type and the Accounting tag corresponds to a topic tag type, such as based on metadata stored (e.g., in the mapping of tags) with the respective tags indicating the types of the tags. The data processing system can populate the second form 910 with the Fannie Mae tag based on both of the second form 910 and the Fannie Mae tag corresponding an investor tag type and populate the second form 916 with the Accounting tag based on both of the second form 916 and the Accounting tag corresponding to the topic tag type. The user can adjust the tags for the natural language query by removing and/or adding tags to any of the respective second forms 910-916. The user can select the submit button 918 to cause the client device presenting the user interface 1000 to transmit the natural language query and the tags to the data processing system. In some cases, the client device can include indicators of the types of the tags in the message that can be used to provide context for the tags. In some cases, the client device can transmit the identifiers of the threads in the chat history 906 and/or the threads themselves from the chat history 906 to the data processing system such that the data processing system can use the threads from the chat history 906 (e.g., based on the received threads and/or by identifying the threads from memory and retrieving the threads based on the identifiers included in the message).

Referring again to FIG. 8, in an operation 850, the data processing system retrieves a subset of the sets of data. The data processing system can retrieve the subset of the sets of data based on or using the tags assigned or determined for the natural language query. For instance, the user can select a submit button to cause the natural language query and the tags assigned for the natural language query to the data processing system. Responsive to the selection, the client device can transmit a message containing the natural language query and the tags assigned for the natural language query. The data processing system can identify the tags from the message. The data processing system can compare the tags to tags assigned to sets of data for digital documents stored in the database. Responsive to identifying a match (e.g., an identical match) between at least one tag of a set of data and at least one tag received with the natural language query, the data processing system can identify and/or retrieve the set of data from the database. The data processing system can similarly retrieve any number of sets of data for documents from the database. By doing so, the data processing system can identify sets of data that contain or may contain data that is relevant for generating a response to the natural language query, thus reducing the amount of data to query when generating the response, reducing the processing resources required for the query as well increasing the relevance of any retrieved data to reduce hallucinations in a response generated for the natural language query.

In some cases, the data processing system can use a large language model (e.g., a neural network, a transformer, etc.) to query the database for sets of data. For example, the data processing system can execute the large language model using the tags received in the message with the natural language query as input (e.g., in an input prompt). Based on the execution, the large language model can generate (e.g., automatically generate) a query (e.g., a first query) in a schema that can be used to query the database. The large language model can include the tags in the query such that the data processing system can use the query to identify sets of data that contain the tags received with the natural language query. The data processing system can execute or use one or more application programming interfaces (APIs) with the query to identify the sets of data from the database that contain or correspond to at least one tag that matches at least one tag received with the natural language query.

In an operation 860, the data processing system queries the retrieved subset of the sets of data based on the natural language query. The data processing system can query the retrieved subset of the sets of data by generating a query (e.g., a second query). The data processing system can generate the second query based on the natural language query. For instance, the data processing system can input the natural language query into the large language model that generated the first query for retrieving the subset of the sets of data or a different large language model (e.g., a second large language model). The large language model can be trained to generate queries to use to retrieve data from retrieved subsets of sets of data. For instance, the large language model can be configured or trained to generate SQL queries. The large language model can generate a second query in an SQL schema based on the natural language query. The large language model can generate the second query to include attributes.

The large language model or the data processing system can use the second query to query the subset of the sets of data. For instance, the large language model or the data processing system can execute the second query within the retrieved subset of the sets of data to retrieve data from the subset of the sets of data according to the attributes of the second query. The large language model or data processing system can use one or more APIs (e.g., the same APIs that were used to perform the first query or different APIs) to perform the second query in the subset of the sets of data.

In some embodiments, the data processing system only performs the operation 850 to identify the subset of the sets of data from the database response to or based on a selection of an indicator from the user interface at which the user input the natural language query. For example, the user interface can include a box or another form that can be selected or unselected to indicate whether to perform a filtered search. Responsive to the user selecting the indicator to indicate to perform a filtered search, the data processing system can receive the selection and perform the operation 850 to identify the subset of the sets of data to query to generate a response to natural language query. However, responsive to the user configuring the indicator to indicate not to perform a filtered search, the data processing system can receive the natural language query either with an indicator not to perform a filtered search or without any indicator to perform a filtered search. Responsive to receiving natural language query in this manner, the data processing system can query the database to retrieve relevant data for generating a response without first identifying a subset of the sets of data.

In an operation 870, the data processing system generates a data structure. The data processing system can generate the data structure to contain the response data. The data processing system can use the large language model to generate the data structure to include the retrieved response data in a structured format, such as in a JSON format, an XML format, and/or as structured objects. The data structure can be formatted in a manner that the large language model or a different large language model can use the data to generate a response to the natural language query.

The data processing system can generate a visual representation based on the response data in the data structure. To do so, the data processing system can process the data of the data structure using the large language model to generate a visual representation of the data in the data structure according to the natural language query. For example, the large language model can determine a format in which to generate a response based on the natural language query. Such formats can include, a table, a report, a graph, a text summary, etc. The large language model can determine the format for the response by determining the context or intent in the natural language query. The large language model can determine the format, retrieve the data from the data structure, and generate a visual representation of the data in the data structure in a format appropriate for responding to the natural language query (e.g., in a format requested in the natural language query).

In an operation 880, the data processing system presents the visual representation of the data structure at the client device. To do so, the data processing system can transmit the visual representation of the data structure to the client device. The visual representation can be or include a response to the natural language query. The visual representation can include the requested data regarding the sets of data.

Figure 11:
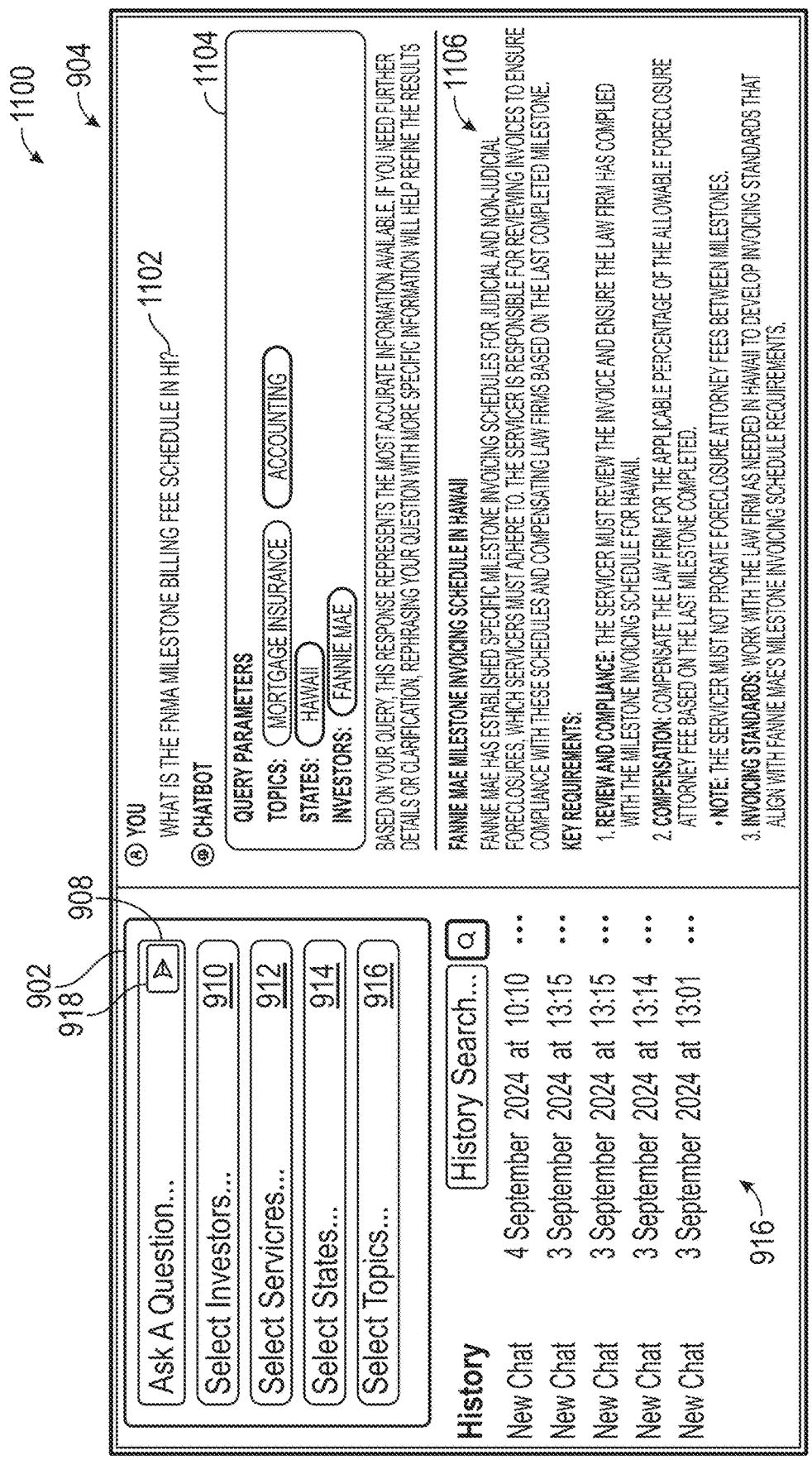

For example, referring now to FIG. 11, a user interface 1100 is shown. The user interface 1100 can be an updated version of the user interface 1000, shown and described with reference to FIG. 10, subsequent to the data processing system receiving the natural language query from the first form 908 and any tags in the second forms 910-916 and identifying messages of threads, if any, identified in the chat history 906, and generating a response to the natural language query. For instance, the data processing system can receive the natural language query from the first form 908 and any tags from the second forms 910-916 and identify any messages of the threads identified in the chat history 906. The data processing system can update (e.g., responsive to receiving the message upon selection of the submit button 918) the response interface 904 to depict the natural language query 1102 from the first form 908 and the tags from the second forms 910-916 as query parameters 1104. The data processing system can use (e.g., subsequent to or concurrently with updating the response interface 904 to depict the natural language query 1102), the tags from the second forms 910-916 to identify a subset of the sets of data from the database that each correspond to at least one tag that matches (e.g., is identical to) at least one of the tags received from the second forms 910-916. The data processing system can execute one or more large language models to generate a query based on the natural language query from the first form 908. The one or more large language models can use the generated query to retrieve data (e.g., response data) from (e.g., only from) the retrieved subset of the sets of data. The one or more large language models can generate a data structure with the retrieved response data. The one or more large language models can generate a visual representation of data in the data structure based on the natural language query. The data processing system can present the visual representation in the response interface 904 as a response 1106.

For instance, an AI engine (e.g., the AI engine 120) can receive a natural language query from a user interface (e.g., the user interface 110) coupled to the AI engine. The natural language query can be a request for information or content from the AI engine. The AI engine can additionally receive a tag (e.g., a field-specific term) from the user interface to identify a particular field of interest for the natural language query. The tag can be a pre-selected term selected from a drop-down menu or a pre-selected term from a list, or may be automatically populated by the AI engine. The tag may correspond to a term in a custom dictionary configured to identify particular fields or domains for use by the AI engine. In some embodiments, the tag is added to a custom dictionary if the term is not already in the dictionary.

The AI engine can generate a response to the natural language query using the identified tag. The AI engine can use the identified tag to refine the generated response and increase accuracy and relevance. The response can be presented via the user interface.

Figure 12:
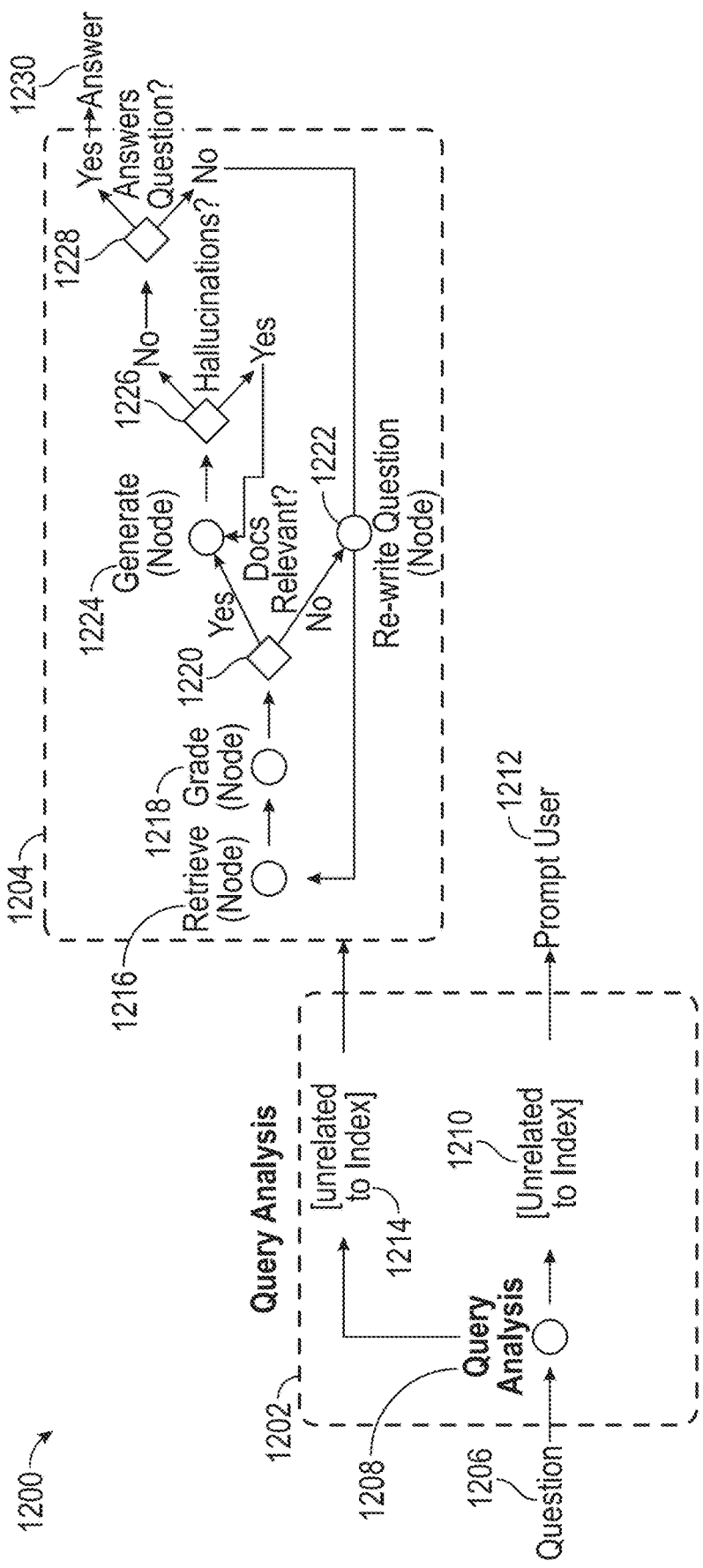
FIG. 12 is a sequence illustrating example operations performed by the system of FIG. 1, according to some implementations.

Referring now to FIG. 12, a sequence 1200 for generative machine learning model response generation, according to an example embodiment. In some implementations, the sequence 1200 can be performed by a data processing system (e.g., using the toolbox module 128 of the AI engine 120, shown and described with reference to FIG. 1) such as any of the components of the system 100, shown in FIG. 1, or the computing system 1400. The sequence 1200 may include more or fewer operations and the operations may be performed in any order. Operations of the sequence 1200 can be performed with or in conjunction with the operations of the method 800. Performance of the sequence 1200 may enable the data processing system to generate responses to natural language queries that involve a data retrieval step more accurately and more efficiently (e.g., using computing resources) than other response generation techniques involving a data retrieval step using an initial filtering and tagging technique.

The sequence 1200 can include two portions, a query analysis portion 1202 and a response generation portion 1204. In the query analysis portion 1202, the data processing system can analyze the natural language query to determine whether the natural language query can be answered using data stored by the data processing system. The data processing system can do so, for example, by identifying any tags transmitted with (e.g., concurrently and separate from) the natural language query and comparing the tags to tags of sets of data stored in a database. The data processing system can determine whether the data processing system can answer the natural language query by determining whether there is at least one tag of a set of data that matches at least one of the tags received with the natural language query. In the response generation portion 1204, the data processing system can analyze natural language query and a response generated based on the natural language query to determine whether the response adequately answers the natural language query. The data processing system can present the response responsive to determining the response adequately answers natural language query.

For instance, in the query analysis portion 1202, the data processing system can receive a question 1206 (e.g., a natural language query requesting data or an analysis of data stored by the data processing system). The data processing system can receive one or more tags with the natural language query, as described herein. At operation 1208, the data processing system can perform a query analysis. In performing the query analysis, the data processing system can compare any tags with tags of sets of data stored in the database. Responsive to determining there are not any matching tags, or responsive to determining the question did not accompany any tags, the data processing system can determine 1210 the question 1206 is not related to the data of the database storing sets of data generated from uploaded documents. The data processing system can generate or transmit a prompt or message to the user via the chat interface indicating the question was not related to the index of sets of data generated from documents. The user can view the prompt and adjust the question 1206, input a new question, and/or update the tags and transmit the updated question and/or tags to the data processing system to repeat the process. However, responsive to determining 1214 there is at least one matching tag, the sequence 1200 can proceed to the response generation portion 1204. In some cases, the data processing system may only perform the query analysis portion 1202 of the sequence 1200 responsive to receiving an indicator corresponding to performing a filtered search by first identifying a subset of the sets of data from which to query data. Otherwise, the data processing system may skip the query analysis portion 1202 and perform the response generation portion 1204 responsive to receiving the question 1206.

In the response generation portion 1204, at operation 1216, the data processing system can identify the question 1206 and any tags received with the question 1206. The data processing system can apply one or more rules (e.g., a grammar check, a spell check, etc.) to the question 1206 and automatically adjust or change the question 1206 using the rules. For example, the data processing system can automatically fix any spelling or grammatical errors in the question 1206. The data processing system can position the tags with the question, such as by inserting the tags before or after the question 1206. In doing so, the data processing system can generate a prompt to use as input into a large language model.

At operation 1216, the data processing system can grade the prompt generated from the question 1206 and/or the tags of the question 1206. The data processing system can grade the prompt by generating a confidence level for the prompt indicating a likelihood that the data processing system can retrieve data that is relevant to generating a response to the prompt. The data processing system can generate the confidence level, for example, by executing an API or performing an API call to a system configured to generate such confidence levels. In some cases, the data processing system can execute a machine learning model (e.g., a neural network, a support vector machine, a random forest, etc.) that has been trained to generate such confidence levels. For instance, the machine learning model may be trained using text prompts as inputs with labels indicating whether the large language model was able to retrieve data from the database based on the text prompts or otherwise generated a response that satisfied the user (e.g., based on a user input indicating whether the response was satisfactory). The confidence level can be within a range (e.g., a defined range), such as between 1 and 100 or between 0 and 100. In some cases, the large language model can determine the confidence level by generating an embedding from the prompt and comparing the embedding to embeddings for the sets of data in the database. The data processing system can determine the confidence level based on a level of similarity (e.g., the maximum level of similarity) that the generated embedding has with one or more embeddings in the database (e.g., the higher the similarity, the higher the confidence level, the higher the number of embeddings with similarities above a threshold, the higher the confidence level, etc.). In some cases, the data processing system can determine the confidence level based only on a subset of the sets of data that each contain a matching tag to at least one tag of (e.g., received with) the question 1206, such as in cases in which the data processing system receives an indicator corresponding to performing a filtered search with the or corresponding to the question 1206.

The data processing system can compare the confidence level to a threshold (e.g., a predetermined threshold). Responsive to determining the confidence level is below the threshold, the large language model or the data processing system can generate a response indicating an answer could not be generated and present the response at the user interface at which the user input the question 1206. In some cases, responsive to determining the confidence level is below the threshold, the large language model can generate a response to the question 1206 without querying the database or sets of data of the database.

In cases in which the data processing system determines the confidence level based only on the subset of the sets of data, the data processing system can generate a new confidence level based on the data in sets of data in the database not included in the subset of the sets of data in addition to or instead of the subset of the sets of data. The data processing system can compare the confidence level to the same threshold or a different threshold as the initial confidence level. Responsive to determining the confidence level is below the threshold, the large language model can generate a response to the question 1206 without querying the database or sets of data of the database.

Responsive to determining one of the confidence levels is above a threshold, at operation 1220, the data processing system can determine whether documents retrieved to generate a response to the question 1206 contain data that is relevant to generating the response. The data processing system can do so, for example, using the large language model. For example, the large language model can retrieve a subset of the sets of data for documents from the database based on each set of data of the subset corresponding to at least one tag matching at least one tag received with the question 1206. The large language model can analyze the contents of each of the sets of data. The large language model can do so by comparing the question with the sets of data or by generating an embedding with the question and comparing the embedding with embeddings within the individual sets of data of the subset. In some cases, the large language model can determine one or more contexts for each of the respective sets of data and/or the prompt or the question 1206. The large language model can compare the one or more contexts of the question 1206 with the contexts of the respective sets of data of the subset. Responsive to determining the embedding for the question 1206, the context of the question 1206, and/or the question 1206 itself, does not match or have a similarity with any embedding, context, or portion of a set of data of the sets of data based on the comparison, the data processing system can proceed to operation 1222. Otherwise, the data processing system can proceed to operation 1224. In cases in which the large language model does not perform a first filtering operation on the sets of data, the large language model can perform the same operation but with each of the sets of data stored in the database.

In the operation 1222, the data processing system can rewrite the prompt that was originally input into the large language model. The data processing system can rewrite the prompt in one of a few manners, in some cases through the large language model. For example, the data processing system can change the positioning of the words in the prompt to rewrite the prompt. In another example, the data processing system can rewrite the prompt by retrieving the initial question 1206 prior to changing the question in the operation 1216 (e.g., the data processing system can store the initial question 1206 in a cache prior to updating the question 1206 to generate the initial prompt, and the data processing system can retrieve the question 1206 from the cache). In another example, the data processing system can execute a machine learning model (e.g., a neural network, a support vector machine, a random forest, etc.) using the prompt as input to cause the machine learning model to output a new prompt based on the initial prompt. The machine learning model may have been trained to generate prompts based on input prompts based on a training dataset of prompts into the large language model containing labels indicating whether the prompts caused the large language model to generate responses that satisfied the users that input the prompts. In some embodiments, the machine learning model can be the large language model that performed the initial query. The data processing system can rewrite the prompt and return to the operation 1216. The data processing system can repeat the operations 1216-1222 until identifying a prompt that causes the large language model to retrieve data relevant to generating a response and/or for a threshold number of instances until the data processing system or the large language model generates an alert at the user interface indicating a response could not be generated.

In the operation 1224, the data processing system can generate a response to the question 1206. The data processing system can generate the response using the large language model. For example, the data processing system can execute the large language model using the prompt generated from the question 1206 to retrieve the subsets of the sets of data corresponding to at least one tag that matches at least one tag of the question 1206. From the retrieved subset, the large language model can retrieve data that is relevant to generating a response to the question 1206. The large language model can generate a data structure with the retrieved data. The large language model can retrieve data from the data structure and use the retrieved data to generate a response to the question 1206.

In the operation 1226, the data processing system can analyze the generated response to determine whether the response contains one or more, or at least a threshold number, of hallucinations. For example, in some cases, the data processing system can perform the check using separate applications configured to perform similar operations to those of the natural language query. For instance, if the question 1206 is to count a number of drivers identified in a data set that were pulled over for speeding, the data processing system can identify the number of drivers indicated in the response generated by the large language model and execute an application configured to count such types of data to make the same determination. In doing so, the data processing system can use the application on the same sets of data that the large language model retrieved to generate the response. Any difference between the two results can indicate a hallucination. Other types of applications that may be used to determine accurate results can include calculator applications, natural language processing applications, etc. Each difference can indicate a hallucination. In another example, the data processing system can determine hallucinations using rules. The rules can be checks to determine if the data originated from sets of data that are within a threshold date of the current date. The data processing system can determine hallucinations in a response in any way. Responsive to identifying a hallucination or at least a threshold number of hallucinations, the data processing system can return to the operation 1224. The data processing system can repeat the operations 1224-1226 until the large language model generates a response without any hallucinations or with a number of hallucinations below the threshold. The repetitive iterations can have different results because a temperature value of the large language model may cause the large language model to generate different answers depending on the probabilities of the potential answers. In some cases, the data processing system can repeat the operations 1224 and 1226 for a threshold number of instances until the data processing system or the large language model generates an alert at the user interface indicating a response could not be generated.

Responsive to determining the response does not contain any hallucinations or contains less than the threshold number of hallucinations, at operation 1228, the data processing system can determine whether the response answers the question 1206 through an API call or by writing a request to the large language model asking to rate the accuracy of the response, for example. The data processing system can use any method to determine an accuracy of the response. In doing so, the data processing system can obtain or generate a confidence level for the response. The data processing system can compare the confidence level to a threshold (e.g., a predetermined threshold). Responsive to determining the confidence score is below the threshold, the data processing system can return to the operation 1222. Otherwise, the data processing system can present the response at the client device through which the question 1206 was input as an answer 1230 to the question.

Figure 13:
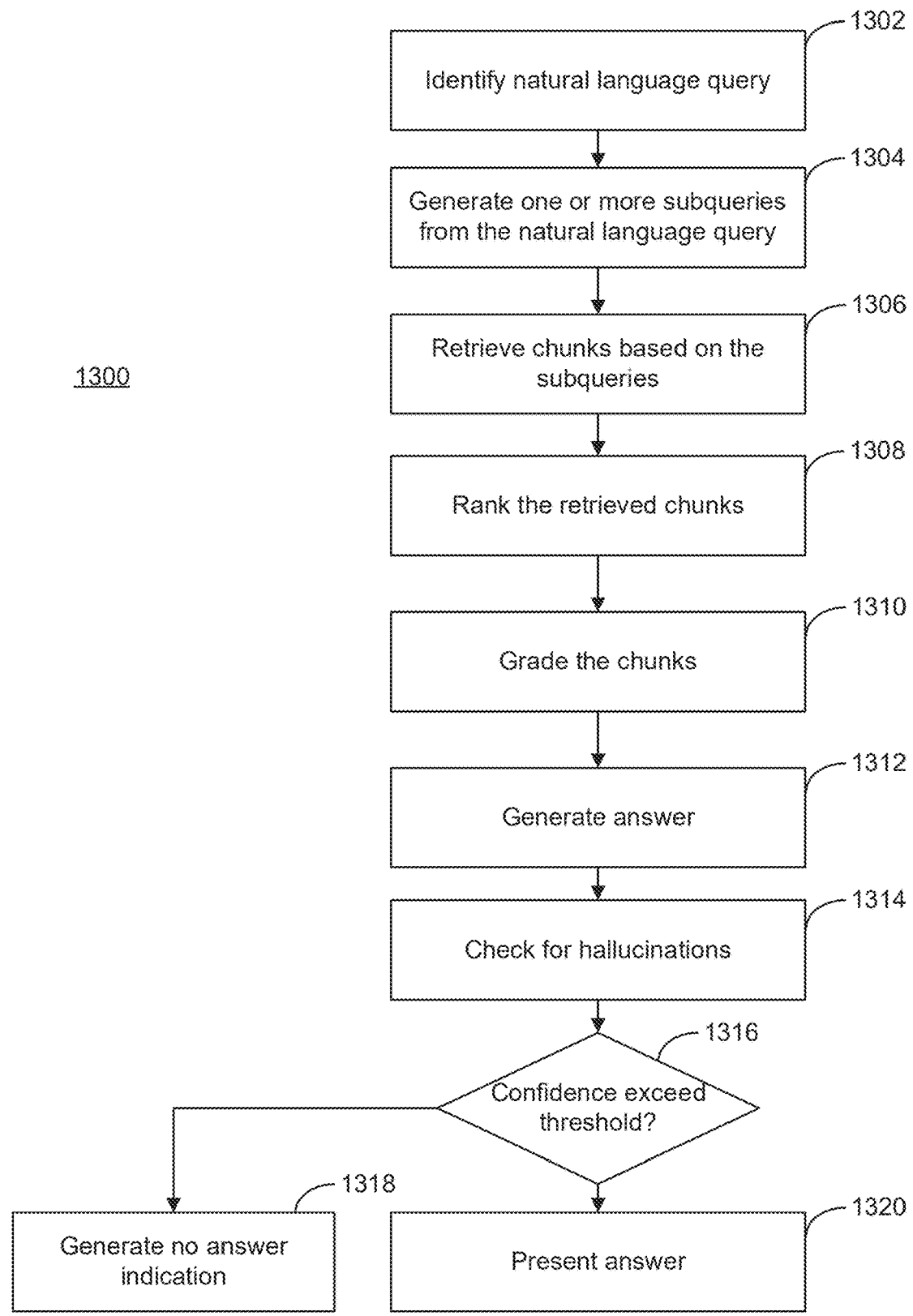
FIG. 13 is a flow chart illustrating example operations of a method of generating an answer to a natural language query, according to some implementations.

FIG. 13 is a flow diagram of a method 1300 of generating an answer to a natural language query, according to some implementations. In some implementations, the method 1300 can be performed by a data processing system such as any of the components of the system 100, shown in FIG. 1, or the computing system 1400. The method 1300 may include more or fewer operations and the operations may be performed in any order. The data processing system can perform the method 1300 when performing (or in place of) one or more of the operations 860-880 (e.g., subsequent to retrieving a subset of a set of data based on tags generated from a natural language query). Performance of the method 1300 may enable the data processing system to generate responses to natural language queries that involve a data retrieval step more accurately and more efficiently (e.g., using fewer computing resources) than other response generation techniques. In doing so, the data processing system can reduce hallucinations in answers to natural language queries.

In an operation 1302, the data processing system identifies a natural language query. The natural language query can be a natural language query that the data processing system receives from a user interface. For instance, the data processing system can present a user interface at a client device that includes one or more forms into which a user can provide input. The data processing system can receive a natural language query from the user interface and tag the natural language query with one or more tags using the systems and methods described herein (e.g., as described with respect to operations 810-830 of FIG. 8). The data processing system can use the tags to retrieve a subset of sets of data from a plurality of sets of data stored in a database as described with respective to operations 840 and 850 of FIG. 8. Each of the subset of sets of data can be divided and/or organized into one or more chunks including data of a document from which the set of data was generated. The data processing system can then identify the natural language query based on which the data processing system retrieved the subset of sets of data.

In an operation 1304, the data processing system generates one or more subqueries. Each subquery can be a string of text that the data processing system generates from or based on the natural language query. The data processing system can generate the one or more subqueries using a first large language model. The first large language model can be the same large language model used to retrieve the subset of sets of data based on the natural language query, or can be a different large language model. The first large language model can generate the one or more subqueries based on the natural language query by dividing the natural language query into one or more subqueries. For example, the data processing system can input the natural language query into the first large language model and execute the first large language model. Based on the execution, the first large language model can separate the natural language query into one or more subqueries. The first large language model can separate the natural language query by dividing the natural language query into subqueries of individual words, characters, or groups of words. In one example, the natural language query can include a multi-part question. The first large language model can separate the natural language query into a sub-query for each part of the question. In some cases, the first large language model can separate the natural language query by dividing the natural language query into groups of words that are related to each other or according to the training of the first large language model. For instance, the first large language model may be trained to divide the natural language query into groupings of words based on a training dataset that includes indications of groups of words to generate based on natural language queries. The first large language model may be trained based on words that are grouped according to any ruleset. The first large language model can generate any number of subqueries based on the natural language query, in some cases up to a defined limit (e.g., a maximum of five or any other defined number) of subqueries.

In some cases, the first large language model can generate subqueries by generating new words or groups of words based on natural language queries. For instance, instead of only dividing the natural language query into separate groupings or subqueries, the first large language model can add new text to each grouping and/or reframe the natural language queries into new subqueries. The first large language model may do so based on the training of the first large language model.

In an operation 1306, the data processing system retrieves chunks based on the subqueries. The data processing system can retrieve the chunks from the subset of sets of data (e.g., documents) that the data processing system retrieved based on tags identified from the natural language query. The data processing system can retrieve the chunks based on or using the subqueries. For instance, a second large language model (or the first large language model, in some cases) different from the first large language model can compare each of the respective subqueries with the contents of the chunks of the subset of sets of data. The second large language model can perform the comparison, for example, by identifying one or more words (e.g., keywords, such as words that are defined in memory of the data processing system as being keywords) from each subquery and comparing the words to words in the respective chunks. The second large language model can identify and/or retrieve chunks that have at least a defined number of matching words to the identified words of the subqueries. In another example, the second large language model can determine a context of each subquery and contexts of the respective chunks. The second large language model can retrieve chunks that have matching chunks to the contexts of the subqueries. In another example, the second large language model can generate an embedding for each subquery. The second large language model can compare the embeddings of the subqueries to the embeddings of the respective chunks and retrieve chunks from the subset of the sets of data based on a similarity between the embeddings of the subqueries and embeddings of the chunks satisfying a criterion (e.g., exceeding a threshold or being one of a defined number of chunks with a highest similarity compared to other chunks for the same subquery and/or based on all of the comparisons). The second large language model can compare the subqueries to the chunks for retrieval in any manner.

In some cases, the second large language model can retrieve a defined number (or up to a defined number, such as 10) of chunks from the subset of the sets of data. The second large language model can retrieve the defined number of chunks for each subquery generated from the natural language query. For example, the second large language model can compare each subquery to the chunks of the subset of sets of data as described above. Based on the comparison, the second large language model can retrieve up to a defined number of chunks for each subquery. The second large language model can do so for each subquery in one of a few manners. For example, for a subquery, the second large language model can identify a defined number of chunks with the most or highest number of words or keywords that match words of the subquery of the chunks of the subset of sets of data. In another example, the second large language model can identify the defined number of chunks that correspond with embeddings with a highest similarity with an embedding of the subquery. In another example, the second large language model that correspond with contexts that most closely match the context of the subquery. In another example, the second large language model can use each of such comparisons as factors to determine a confidence score (e.g., a chunk confidence score) for each chunk for the subquery. The second large language model can compare the confidence scores between each other and identify the defined number of chunks that correspond with the highest confidence scores. The second large language model can identify chunks for the subquery in any way. The second large language model can similarly identify the chunks for each subquery generated for the natural language query.

In an operation 1308, the data processing system ranks the retrieved chunks. The data processing system can rank the retrieved chunks between each other. The data processing system can rank the retrieved chunks according to a relevance of each chunk to the natural language query or to answering the natural language query. For instance, the data processing system can rank the retrieved chunks using a reranking model (e.g., a cross-encoder) that is configured to generate similarity scores between natural language queries and documents (e.g., sets of data) or chunks generated from documents. The data processing system can input the chunks and/or the natural language query into the reranking model and execute the reranking model. Based on the execution, the reranking model can apply semantic similarity analysis to generate a similarity score for each chunk indicating a degree of similarity (e.g., relevance) between the chunk and the natural language query. The reranking model can do so, for example, by generating embeddings from the natural language query and the chunks and determining a level of similarity between the embeddings, such as by using cosine similarity, or through any other technique. The reranking model can compare the similarity scores between the chunks and rank the chunks based on the similarity scores (e.g., by ranking the chunk with the highest similarity score first). The reranking model can identify a defined number (e.g., 10) of the highest ranked chunks, or a defined number of the chunks with the highest similarity scores between the chunks.

In an operation 1310, the data processing system grades the chunks (e.g., the chunks identified as corresponding to the highest rankings or similarity scores). The data processing system can grade the chunks using a third large language model (e.g., a large language model different from the first large language model and/or the second large language model) or one of the first large language model or the second large language model. The third large language model can grade the chunks based on the similarity scores of the chunks. For instance, the third large language model can compare the similarity scores of the chunks to a threshold (e.g., a similarity score threshold). The third large language model can identify any chunks with a similarity score exceeding or satisfying the threshold. The third large language model can discard (e.g., remove from memory or remove from consideration for being used to generate a response to the natural language query) any chunk with a similarity score below the threshold, in some cases. In some cases, the data processing system can determine there are not any relevant chunks that satisfy the threshold. In such cases, the data processing system can proceed to operation 1318, as described below.

In some cases, the data processing system can determine (e.g., automatically determine) to use chunks of data outside of the chunks that the data processing system identified (e.g., using the reranking model) as being the most relevant to generating a response to the natural language query. The data processing system can do so, for example, based on the similarity scores of the identified most relevant chunks. For example, the data processing system can identify the similarity scores of the remaining chunks. The data processing system can aggregate or perform any other operation on the similarity scores to determine an aggregate similarity score of the remaining chunks. The data processing system can compare the aggregate similarity score to a threshold (e.g., an aggregate similarity threshold). Responsive to the aggregate similarity score being below the threshold, the data processing system can determine to query (e.g., using the natural language query itself or individual subqueries of the natural language query)) other sets of data (e.g., sets of data not associated with the tags assigned to the natural language query) within the database for chunks that are relevant to generating a response to the natural language query. In some cases, the data processing system can query other chunks within the subset of sets of data first and, responsive to determining no chunks are similar enough to the natural language query or the subqueries, then query other documents within the database. In doing so, the data processing system can identify or retrieve chunks of data that are relevant above a threshold (e.g., have a similarity score above a threshold) from the sets of data and/or database.

The data processing system can redetermine an aggregate similarity score based on newly retrieved chunks. For instance, subsequent to retrieving new chunks from the subset of the sets of data, the data processing system can determine similarity scores for the new chunks. The data processing system can determine a new aggregate similarity score based on the similarity scores for the new chunks and the chunks previously identified as being most relevant for generating a response. Responsive to determining the new aggregate similarity score does not exceed or satisfy the threshold, the data processing system can similarly query the sets of data in the database. The data processing system can retrieve chunks from the other sets of data in the database and repeat the process of determining an aggregate similarity score from the newly retrieved chunks and the previously retrieved chunks and comparing the aggregate similarity score to the threshold. Responsive to determining the similarity score is below the threshold, the data processing system can generate a message indicating an answer could not be generated. Otherwise, the data processing system can proceed to operation 1312. In some embodiments, the data processing system may stop after querying the subset of sets of data unless an indication to search non-tagged sets of data is selected from the user interface. By using this tiered querying technique, the data processing system can reduce the processing resources required to perform queries over time because the data processing system may only query small pools of data instead of an entire database in many instances to generate answers.

In some cases, instead of or in addition to using an aggregate similarity score to determine whether to perform further querying, the data processing system can determine whether the remaining chunks include enough data to generate a response. The data processing system can do so, for example, by identifying the number of chunks remaining, such as the total number of chunks remaining across subqueries and/or a total number of chunks remaining for each subquery. The data processing system can determine the total number of chunks across subqueries by instantiating a counter. The data processing system can increment the counter for each chunk that is remaining across subqueries. The data processing system can compare the count of the counter to the threshold after the incrementing. Responsive to determining the count is less than the threshold, the data processing system can determine to query the subset of the sets of data and/or the database as described above for further chunks to use to generate a response. The data processing system can additionally or instead determine whether counts for different subqueries exceed a threshold. Responsive to determining any of such counts exceed the threshold, the data processing system can determine to query the subset of the sets of data and/or the database as described above further chunks to use to generate a response. The data processing system can determine whether there is enough data in the chunks in any manner.

In the operation 1312, the data processing system generates an answer to the natural language query. The data processing system can generate the answer to the natural language query using a large language model, which can be any of the first, second, or third large language model, or a different large language model. The large language model can generate the answer (e.g., the response) to the natural language query based on the chunks identified based on similarity scores (e.g., the non-discarded chunks and/or otherwise retrieved and remaining as described above) with the natural language query. To do so, the large language model can receive the natural language query as input and generate a query (e.g., such as an embedding of the natural language query). The large language model can query the identified chunks with the query to generate response data. The large language model can generate an answer to the natural language query from the response data that is responsive to the natural language query and/or in a requested format of the natural language query, as described herein.

In some embodiments, when generating the answer from the chunks, the data processing system can use a weighting schema to identify which chunks to use or query first to generate the answer. For instance, the data processing system can assign weights (e.g., values between 0 and 1 or between 0 and 100) to each of the respective chunks. Subsequently, when the large language model generates the answer, the large language model can retrieve data from the chunks in order starting with the higher weighted chunks first, such as until the large language model retrieves enough data to generate the answer. In some cases, the large language model can prioritize using data from the higher weighted chunks, such as to avoid using inaccurate and/or irrelevant data to generate the answer.

The data processing system can determine the weightings to assign the chunks in any manner. The data processing system can do so, for example, based on the similarity scores of the chunks. For instance, the data processing system can weight the chunks in descending order starting with weighting the initial chunk the highest. The weights can be proportional to the similarity score such that higher scores correspond to higher weights. The data processing system can determine the weights for chunks in any manner.

In an operation 1314, the data processing system checks for hallucinations. The data processing system can check for hallucinations using one of the methods described above with respect to operation 1226. In some cases, responsive to determining the answer includes one or at least a defined number of hallucinations, the data processing system can repeat the operation 1312 to generate a new or a second answer. The data processing system can repeat the operations 1312 and 1314 any number of times until generating an answer with no hallucinations or with a number of hallucinations below a threshold. In some cases, the data processing system can repeat the operations 1312 and 1314 up to a threshold number of times. Responsive to repeating the operations 1312 and 1314 the threshold number of times or more than the threshold number of times, the data processing systems can generate a message to the user interface at which the natural language query was input indicating no answer could be generated.

In response to generating an answer with no hallucinations or a number of hallucinations below the threshold, in an operation 1316, the data processing system determines whether the large language model has a confidence in the answer above or satisfies a threshold (e.g., a confidence threshold). The data processing system can do so using a large language model. For instance, the data processing system can determine the confidence in the answer by determining whether the answer is relevant to the natural language query. For example, the data processing system can perform a semantic analysis on the answer and the natural language query to determine whether the context of the answer matches or otherwise corresponds to the natural language query. In another example, the data processing system can generate an embedding from each of the natural language query and the answer and determine a distance or similarity between the embeddings. The closer the two embeddings, the more relevant they are to each other and/or the higher the confidence in the answer. Other examples of factors that the data processing system can use to determine a confidence for the answer can be or include semantic matching between the natural language query and the answer, accuracy and authority from which the data processing system retrieved data to generate the answer, completeness and depth of the answer, recentness and currency of the sources from which the data processing system retrieved data to generate the answer, etc. The data processing system can use a function (e.g., average or median) on any combination of such factors to determine a confidence for the answer, or only use one of such factors to determine the confidence for the answer. The data processing system can compare the confidence to a threshold to determine whether the confidence for the answer exceeds or otherwise satisfies the threshold. In some cases, the data processing system can implement other guardrails, such as NeMo guardrails in operations 1314 and 1316 to check the answer and/or cause the data processing system to return to operation 1312 to generate a new answer.

Responsive to determining the confidence does not exceed the threshold, in an operation 1318, the data processing systems can generate a message to the user interface at which the natural language query was input indicating no answer could be generated. However, in response to determining the confidence exceeds or satisfies the threshold in an operation 1320, the data processing system can present the answer at the user interface.

The GenAI system described herein can enable human users to provide prompts to a generative AI computer system and receive responses to the queries from the GenAI system. Example embodiments described herein feature a customizable dictionary configured for use with a GenAI computer system and tailored to specific fields or industry terminology. In some embodiments, users input terms unique to their organization, ensuring the custom dictionary evolves to meet their needs. Each term can be categorized-such as Topics, Clients, or Industry Organizations-forming the foundation for metadata tagging. Advantageously, the custom dictionary can help to provide technical solutions to a variety of technical problems related to GenAI discussed above, including hallucinations, bias, and ambiguity.

Example embodiments described herein further include a toolbox program that integrates with the custom dictionary to enhance user interactions. The toolbox program organizes terms by predefined categories, streamlining query construction and providing insights into how responses are generated. It serves at least three functions: providing feedback on queries, structuring queries, and refining follow-up queries.

In at least one embodiment, the GenAI user interface interacts with a toolbox program to highlight key terms used in response construction before presenting the full answer to a user. The GenAI user interface leverages the custom dictionary to refine queries and enhance response accuracy. Users can select relevant dictionary terms during query submission, streamlining the process without needing to manually input every term. For instance, when seeking documents related to multiple clients, users can add those client names from menu options rather than typing them out. Similarly, selecting specific department and topic terms helps the system retrieve all relevant documents more efficiently. After a response is generated, the toolbox program provides an option to refine the results further. Users can add additional terms—such as client names or locations—to narrow the scope and improve the relevance of subsequent answers.

In at least one embodiment, when uploading documents, the GenAI user interface automatically tags files based on their content. Incorporating the toolbox program into this process enables users to apply specific tags consistently across multiple documents, reducing errors and speeding up the tagging process. For example, if a user is uploading several documents for a particular client, they can apply that client's name as a tag to all documents at the outset, leveraging their existing knowledge of the files.

Advantageously, the GenAI system described herein addresses drawbacks and technical problems of conventional AI programs, including technical challenges associated with large tables, particularly during chunking processes where tables are broken into sections, losing context like header rows. Embodiments of the GenAI system described address this technical problem using additional information with each segment: a header row and a paragraph that precedes the table. The preceding paragraph explains the table's content and usage, which is important for the model to accurately understand and process the data. This approach significantly improves the model's ability to parse large tables and generate more accurate responses based on them.

As described herein, the same or different large language models can perform each operation, individual operations, and/or subsets of the operations of the method 800 or the sequence 1200. For example, the same large language model can perform each of the operations of the method 800 and the sequence 1200, a different large language model can perform each of the operations of the method 800 or the sequence 1200, or different large language model can perform sets of the operations of the method 800 and the sequence 1200.

In one example, a method includes storing, by one or more processors, a database comprising sets of data each corresponding to a different digital document uploaded to the one or more processors and corresponding to a category tag assigned to the digital document corresponding to the set of data; receiving, by the one or more processors from a client device via a first query form presented on a user interface at the client device, a natural language query, the natural language query comprising a request for data regarding one or more of the sets of data stored in the database; parsing, by the one or more processors, the natural language query to generate one or more parsed tags each indicating a context of the natural language query; updating, by the one or more processors, a second query form on the user interface with the one or more parsed tags; responsive to a selection of a submit button on the user interface, retrieving, by the one or more processors using one or more generative language models, a subset of the sets of data based on each set of data of the subset corresponding to at least one assigned category tag of the one or more parsed tags indicated in the second query form on the user interface; querying, by the one or more processors using the one or more generative language models, the retrieved subset of the sets of data based on the natural language query to retrieve response data from the retrieved subset of the set of data; generating, by the one or more processors, a data structure containing the response data; and presenting, by the one or more processors, a visual representation of the data structure at the client device.

In some embodiments, the method includes receiving, by the one or more processors, the digital documents from one or more remote computing devices; and automatically assigning, by the one or more processors, the category tags to the digital documents based on the content of the digital documents. In some embodiments, automatically assigning the category tags to the digital documents comprises parsing, by the one or more processors, each of the digital documents to identify one or more keywords in each of the digital documents; and generating, by the one or more processors, the category tags for the digital documents based on a mapping between the one or more keywords the category tags stored in a data structure.

In some embodiments, the method further includes storing, by the one or more processors, the data structure containing the mapping of the one or more keywords to the category tags; receiving, by the one or more processors, an input from a remote computing device comprising a second mapping between a second keyword and a second category tag; and updating, by the one or more processors, the mapping to contain the second mapping between the second keyword and the second category tag, wherein generating the category tags for the digital documents comprises generating, by the one or more processors, the category tags for the digital documents using the updated mapping. In some embodiments, parsing the natural language query includes identifying, one by the one or more processors, one or more keywords of the natural language query; and generating, by the one or more processors, the one or more parsed tags based on the one or more keywords of the natural language query. In some embodiments, generating the one or more parsed tags comprises generating, by the one or more processors, the one or more parsed tags based on a mapping between the one or more keywords of the natural language query and the category tags stored in a data structure.

In some embodiments, the method further includes receiving, by the one or more processors, an adjustment to the one or more parsed tags at the second query form; and adjusting, by the one or more processors, the one or more parsed tags based on the received adjustment, wherein retrieving the subset of the sets of data comprises retrieving, by the one or more processors using the one or more generative language models, the subset of the sets of data based on the adjusted one or more parsed tags. In some embodiments, adjusting the one or more parsed tags comprises adding, by the one or more processors, an additional one or more tags to the one or more parsed tags or removing, by the one or more processors, at least one tag from the one or more parsed tags. In some embodiments, the method further includes receiving, by the one or more processors, a selection of an indicator corresponding to performing a filtered search, wherein querying the retrieved subset of the sets of data comprises only querying, by the one or more processors, the retrieved subset of the set of data responsive to the selection of the indicator corresponding to the performing the filtered search.

In some embodiments, the method further includes receiving, by the one or more processors, the digital documents; extracting, by the one or more processors, data from each of the digital documents, the extracted data segmented based on data type; generating, by the one or more processors, a different record for each digital document comprising the extracted data of the digital document segmented by data type and an identifier of the digital document, wherein the extracted data and the identifier of a digital document in each record is a set of data for the digital document of sets of data corresponding to different digital documents; and storing, by the one or more processors, the records containing the sets of data and the identifiers of the digital documents in the database. In some embodiments, extracting the data from each of the digital documents includes, for each of at least one of the digital documents identifying, by the one or more processors, a table from the digital document; identifying, by the one or processors, content of a paragraph type at a location immediately above and/or below the table within the digital document; and generating, by the one or more processors, a segment containing the identified table and the content of the paragraph type in the record with an identifier of the segment.

In one example, a system includes one or more processors coupled to memory, the memory storing computer-readable instructions that, when executed by the one or more processors, cause the one or more processors to store a database comprising sets of data each corresponding to a different digital document uploaded to the one or more processors and corresponding to a category tag assigned to the digital document corresponding to the set of data; receive, from a client device via a first query form presented on a user interface at the client device, a natural language query, the natural language query comprising a request for data regarding one or more of the sets of data stored in the database; parse the natural language query to generate one or more parsed tags each indicating a context of the natural language query; update a second query form on the user interface with the one or more parsed tags; responsive to a selection of a submit button on the user interface, retrieve, using one or more generative language models, a subset of the sets of data based on each set of data of the subset corresponding to at least one assigned category tag of the one or more parsed tags indicated in the second query form on the user interface;

query, using the one or more generative language models, the retrieved subset of the sets of data based on the natural language query to retrieve response data from the retrieved subset of the set of data; generate a data structure containing the response data; and present a visual representation of the data structure at the client device.

In some embodiments, execution of the instructions causes the one or more processors to receive the digital documents from one or more remote computing devices; and automatically assign the category tags to the digital documents based on the content of the digital documents. In some embodiments, execution of the instructions causes the one or more processor to automatically assign the category tags to the digital documents by parsing each of the digital documents to identify one or more keywords in each of the digital documents; and generating the category tags for the digital documents based on a mapping between the one or more keywords the category tags stored in a data structure.

In some embodiments, execution of the instructions further causes the one or more processors to store the data structure containing the mapping of the one or more keywords to the category tags; receive an input from a remote computing device comprising a second mapping between a second keyword and a second category tag; and update the mapping to contain the second mapping between the second keyword and the second category tag, wherein execution of the instructions causes the one or more processors to generate the category tags for the digital documents by generating the category tags for the digital documents using the updated mapping. In some embodiments, execution of the instructions causes the one or more processors to parse the natural language query by identifying one or more keywords of the natural language query; and generating the one or more parsed tags based on the one or more keywords of the natural language query.

In one example, a non-transitory computer-readable medium comprises instructions that, when executed by one or more processors, cause the one or more processors to store a database comprising sets of data each corresponding to a different digital document uploaded to the one or more processors and corresponding to a category tag assigned to the digital document corresponding to the set of data; receive, from a client device via a first query form presented on a user interface at the client device, a natural language query, the natural language query comprising a request for data regarding one or more of the sets of data stored in the database; parse the natural language query to generate one or more parsed tags each indicating a context of the natural language query; update a second query form on the user interface with the one or more parsed tags; responsive to a selection of a submit button on the user interface, retrieve, using one or more generative language models, a subset of the sets of data based on each set of data of the subset corresponding to at least one assigned category tag of the one or more parsed tags indicated in the second query form on the user interface; query, using the one or more generative language models, the retrieved subset of the sets of data based on the natural language query to retrieve response data from the retrieved subset of the set of data; generate a data structure containing the response data; and present a visual representation of the data structure at the client device.

In some embodiments, execution of the instructions further causes the one or more processors to receive the digital documents from one or more remote computing devices; and automatically assign the category tags to the digital documents based on the content of the digital documents.

In some embodiments, execution of the instructions causes the one or more processors to automatically assign the category tags to the digital documents by parsing each of the digital documents to identify one or more keywords in each of the digital documents; and generating the category tags for the digital documents based on a mapping between the one or more keywords the category tags stored in a data structure.

In one example, a generative artificial intelligence system includes a user interface to facilitate interaction with a user, wherein the user interface is to receive a natural language query and automatically generate a field-specific term based on the natural language query; an artificial intelligence (AI) engine to generate content based on user input received at the user interface, wherein the artificial intelligence engine includes a custom dictionary tailored to specific terminology and a toolbox module to provide feedback on queries, structure queries, and refine follow-up queries; and a data storage coupled to the AI engine to store a training dataset and a model parameter; and a training module coupled to the AI engine and the data storage to use the training dataset and model parameter to train a model used within the AI engine, wherein the AI engine generates a response to the natural language query received by the user interface using the trained model and a field identified by the field-specific term.

In some embodiments, the user interface includes dropdox menus with a plurality of selections of the field-specific term. In some embodiments, the toolbox module is configured to highlight key terms in the generated response. In some embodiments, the user interface is to receive a refine natural language query to refine results further.

In one example, a generative artificial intelligence system includes a user interface, an AI engine, a data storage, and a training module. The user interface facilitates interactions with a user and receives a query and a field-specific term. The AI engine generates content based on user input received at the user interface and includes a custom dictionary tailored to specific terminology and a toolbox module to provide feedback on queries, structure queries, and refine follow-up queries. The data storage coupled to the AI engine to store a training dataset and a model parameter and training module coupled to the AI engine and the data storage to use the training dataset and model parameter to train a model used within the AI engine. The AI engine generates a response to natural language query received by the user interface using the trained model and a field identified by the field-specific term.

In another example, a method includes receiving a natural language query via a user interface coupled to an artificial intelligence (AI) engine; receiving a field-specific term from the user interface to identify a particular field of interest for the natural language query; generating a response to the natural language query received at the user interface using the field-specific term; and presenting the response via the user interface.

B. Computing Environment

Having discussed specific embodiments of the present solution, it may be helpful to describe aspects of the operating environment as well as associated system components (e.g., hardware elements) in connection with the methods and systems described herein. In a non-limiting example, the computing system 1400 may implement in the generative AI computing system 100 of FIG. 1 or various other example systems and devices described in the present disclosure.

Figure 14A:
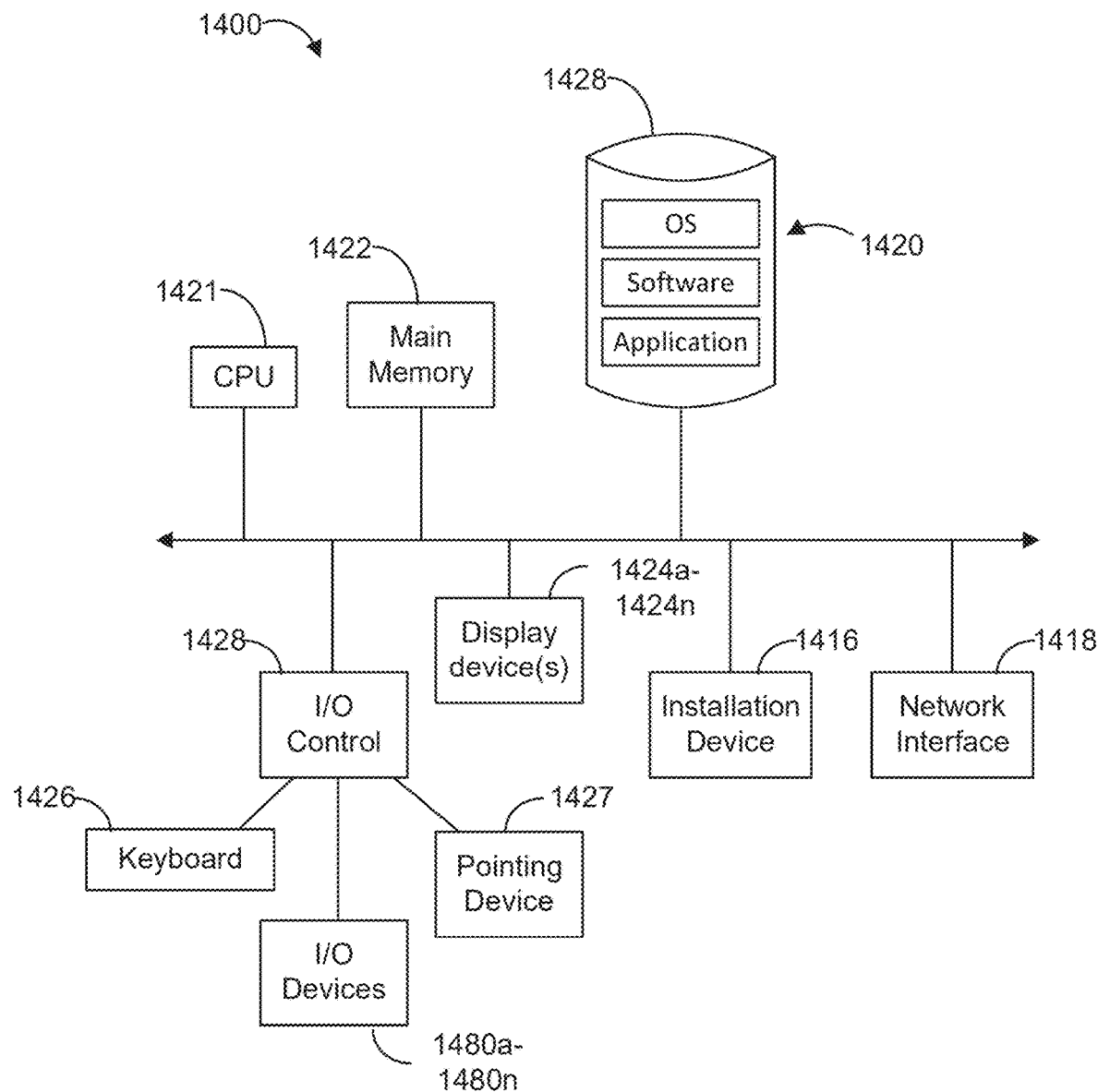
FIGS. 14A and 14B are block diagrams depicting embodiments of computing devices that can be used in connection with the methods and systems described herein.
Figure 14B:
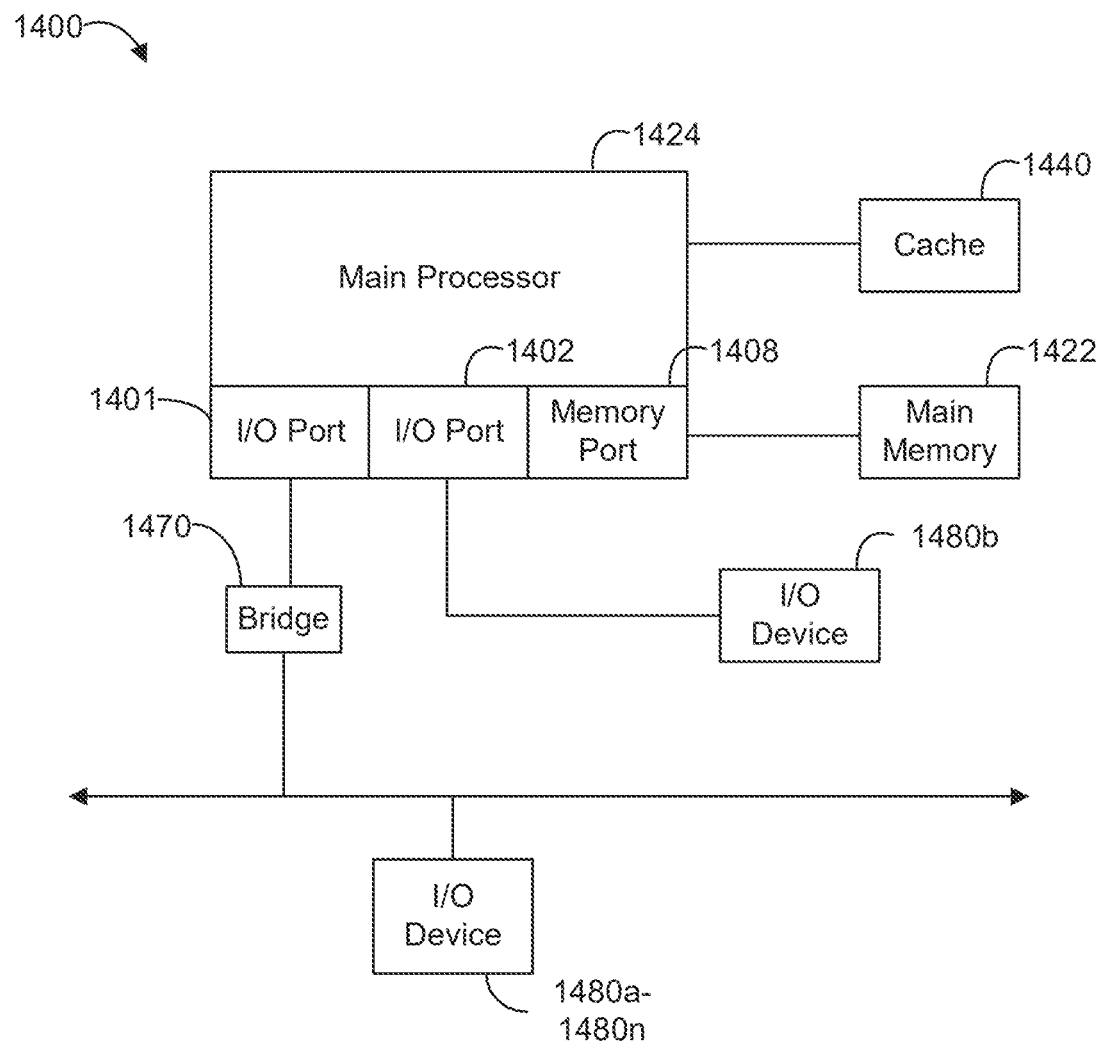

The systems discussed herein may be deployed as and/or executed on any type and form of computing device, such as a computer, network device or appliance capable of communicating on any type and form of network and performing the operations described herein. FIGS. 14A and 14B depict block diagrams of a computing device 1400 useful for practicing an embodiment of the systems and methods described herein. As shown in FIGS. 14A and 14B, each computing device 1400 includes a central processing unit 1421, and a main memory unit 1422. As shown in FIG. 14A, a computing device 1400 may include a storage device 1428, an installation device 1416, a network interface 1418, an I/O controller 1423, display devices 1424a-1424n, a keyboard 1426 and a pointing device 1427, such as a mouse. The storage device 1428 may include, without limitation, an operating system and/or software. As shown in FIG. 14B, each computing device 1400 may also include additional optional elements, such as a memory port 1403, a bridge 1470, one or more input/output devices 1430a-1430n (generally referred to using reference numeral 1430), and a cache memory 1440 in communication with the central processing unit 1421.

The central processing unit 1421 is any logic circuitry that responds to and processes instructions fetched from the main memory unit 1422. In many embodiments, the central processing unit 1421 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 1400 may be based on any of these processors, or any other processor capable of operating as described herein.

Main memory unit 1422 may be one or more memory chips capable of storing data and allowing any storage location to be directly accessed by the microprocessor 1421, such as any type or variant of Static random access memory (SRAM), Dynamic random access memory (DRAM), Ferroelectric RAM (FRAM), NAND Flash, NOR Flash and Solid State Drives (SSD). The main memory 1422 may be based on any of the above described memory chips, or any other available memory chips capable of operating as described herein. In the embodiment shown in FIG. 14A, the processor 1421 communicates with main memory 1422 via a system bus 1480 (described in more detail below). FIG. 14B depicts an embodiment of a computing device 1400 in which the processor communicates directly with main memory 1422 via a memory port 1403. For example, in FIG. 14B the main memory 1422 may be DRDRAM.

FIG. 14B depicts an embodiment in which the main processor 1421 communicates directly with cache memory 1440 via a secondary bus, sometimes referred to as a backside bus. In other embodiments, the main processor 1421 communicates with cache memory 1440 using the system bus 1480. Cache memory 1440 typically has a faster response time than main memory 1422 and is provided by, for example, SRAM, BSRAM, or EDRAM. In the embodiment shown in FIG. 14B, the processor 1421 communicates with various I/O devices 1430 via a local system bus 1480. Various buses may be used to connect the central processing unit 1421 to any of the I/O devices 1430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 1424, the processor 1421 may use an Advanced Graphics Port (AGP) to communicate with the display 1424. FIG. 14B depicts an embodiment of a computer 1400 in which the main processor 1421 may communicate directly with I/O device 1430b, for example via HYPERTRANSPORT, RAPIDIO, or INFINIBAND communications technology. FIG. 14B also depicts an embodiment in which local busses and direct communication are mixed: the processor 1421 communicates with I/O device 1430a using a local interconnect bus while communicating with I/O device 1430b directly.

A wide variety of I/O devices 1430a-1430n may be present in the computing device 1400. Input devices include keyboards, mice, trackpads, trackballs, microphones, dials, touch pads, touch screens, and drawing tablets. Output devices include video displays, speakers, inkjet printers, laser printers, projectors and dye-sublimation printers. The I/O devices may be controlled by an I/O controller 1423 as shown in FIG. 14A. The I/O controller may control one or more I/O devices such as a keyboard 1426 and a pointing device 1427, e.g., a mouse or optical pen. Furthermore, an I/O device may also provide storage and/or an installation device 1416 for the computing device 1400. In still other embodiments, the computing device 1400 may provide USB connections (not shown) to receive handheld USB storage devices such as the USB Flash Drive line of devices manufactured by Twintech Industry, Inc., of Los Alamitos, California.

Referring again to FIG. 14A, the computing device 1400 may support any suitable installation device 1416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 1400 may further include a storage device, such as one or more hard disk drives or redundant arrays of independent disks, for storing an operating system and other related software, and for storing application software programs such as any program or software 1420 for implementing (e.g., configured and/or designed for) the systems and methods described herein. Optionally, any of the installation devices 1416 could also be used as the storage device. Additionally, the operating system and the software can be run from a bootable medium.

Furthermore, the computing device 1400 may include a network interface 1418 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 1400 communicates with other computing devices 1400' via any type and/or form of gateway or tunneling protocol such as Secure Socket Layer (SSL) or Transport Layer Security (TLS). The network interface 1418 may include a built-in network adapter, network interface card, PCMCIA network card, card bus network adapter, wireless network adapter, USB network adapter, modem or any other device suitable for interfacing the computing device 1400 to any type of network capable of communication and performing the operations described herein.

In some implementations, the computing device 1400 may include or be connected to one or more display devices 1424a-1424n. As such, any of the I/O devices 1430a-1430n and/or the I/O controller 1423 may include any type and/or form of suitable hardware, software, or combination of hardware and software to support, enable or provide for the connection and use of the display device(s) 1424a-1424n by the computing device 1400. For example, the computing device 1400 may include any type and/or form of video adapter, video card, driver, and/or library to interface, communicate, connect or otherwise use the display device(s) 1424a-1424n. In one embodiment, a video adapter may include multiple connectors to interface to the display device(s) 1424a-1424n. In other embodiments, the computing device 1400 may include multiple video adapters, with each video adapter connected to the display device(s) 1424a-1424n. In some implementations, any portion of the operating system of the computing device 1400 may be configured for using multiple displays 1424a-1424n. One ordinarily skilled in the art will recognize and appreciate the various ways and embodiments that a computing device 1400 may be configured to have one or more display devices 1424a-1424n.

In further embodiments, an I/O device 1430 may be a bridge between the system bus 1480 and an external communication bus, such as a USB bus, an Apple Desktop Bus, an RS-232 serial connection, a SCSI bus, a FireWire bus, a FireWire 500 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 1400 of the sort depicted in FIGS. 14A and 14B may operate under the control of an operating system, which control scheduling of tasks and access to system resources. The computing device 1400 can be running any operating system, such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, Android, produced by Google Inc.; WINDOWS 14 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 1400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 1400 has sufficient processor power and memory capacity to perform the operations described herein.

In some implementations, the computing device 1400 may have different processors, operating systems, and input devices consistent with the device. For example, in one embodiment, the computing device 1400 is a smart phone, mobile device, tablet or personal digital assistant. In still other embodiments, the computing device 1400 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 1400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all the described terms. References to at least one of a conjunctive list of terms may be construed as an inclusive OR to indicate any of a single, more than one, and all the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:
receiving, by one or more processors from a client device via a first query form presented on a user interface at the client device, a natural language query, the natural language query comprising a request for data regarding one or more of sets of data stored in a database;
parsing, by the one or more processors, the natural language query to generate one or more parsed tags each indicating a context of the natural language query;
updating, by the one or more processors, a second query form on the user interface with the one or more parsed tags;
responsive to a selection of a submit button on the user interface, retrieving, by the one or more processors using one or more generative language models, a subset of the sets of data based on each set of data of the subset corresponding to an assigned category tag that corresponds to at least one of the one or more parsed tags indicated in the second query form on the user interface;
querying, by the one or more processors using the one or more generative language models, the retrieved subset of the sets of data based on the natural language query to generate a response to the natural language query;

presenting, by the one or more processors, the generated response at the client device.

2. The method of claim 1, comprising:

receiving, by the one or more processors, digital documents from one or more remote computing devices;

automatically assigning, by the one or more processors, category tags to the digital documents based on the content of the digital documents; and storing, by the one or more processors, the database comprising the sets of data each corresponding to a different digital document uploaded to the one or more processors and corresponding to a category tag assigned to the digital document corresponding to the set of data.

3. The method of claim 2, wherein automatically assigning the category tags to the digital documents comprises:

parsing, by the one or more processors, each of the digital documents to identify one or more keywords in each of the digital documents; and generating, by the one or more processors, the category tags for the digital documents based on a mapping between the one or more keywords the category tags stored in a data structure.

4. The method of claim 3, further comprising:

storing, by the one or more processors, the data structure containing the mapping of the one or more keywords to the category tags;

receiving, by the one or more processors, an input from a remote computing device comprising a second mapping between a second keyword and a second category tag; and updating, by the one or more processors, the mapping to contain the second mapping between the second keyword and the second category tag, wherein generating the category tags for the digital documents comprises generating, by the one or more processors, the category tags for the digital documents using the updated mapping.

5. The method of claim 1, wherein parsing the natural language query comprises:

identifying, one by the one or more processors, one or more keywords of the natural language query; and generating, by the one or more processors, the one or more parsed tags based on the one or more keywords of the natural language query.

6. The method of claim 5, wherein generating the one or more parsed tags comprises generating, by the one or more processors, the one or more parsed tags based on a mapping between the one or more keywords of the natural language query and the category tags stored in a data structure.

7. The method of claim 1, further comprising:

receiving, by the one or more processors, an adjustment to the one or more parsed tags at the second query form; and adjusting, by the one or more processors, the one or more parsed tags based on the received adjustment, wherein retrieving the subset of the sets of data comprises retrieving, by the one or more processors using the one or more generative language models, the subset of the sets of data based on the adjusted one or more parsed tags.

8. The method of claim 7, wherein adjusting the one or more parsed tags comprises adding, by the one or more processors, an additional one or more tags to the one or more parsed tags or removing, by the one or more processors, at least one tag from the one or more parsed tags.

9. The method of claim 1, further comprising:

receiving, by the one or more processors, a selection of an indicator corresponding to performing a filtered search, wherein querying the retrieved subset of the sets of data comprises only querying, by the one or more processors, the retrieved subset of the set of data responsive to the selection of the indicator corresponding to the performing the filtered search.

10. The method of claim 1, further comprising:

receiving, by the one or more processors, digital documents;

extracting, by the one or more processors, data from each of the digital documents, the extracted data segmented based on data type;

generating, by the one or more processors, a different record for each digital document comprising the extracted data of the digital document segmented by data type and an identifier of the digital document, wherein the extracted data and the identifier of a digital document in each record is a set of data for the digital document of sets of data corresponding to different digital documents; and storing, by the one or more processors, the records containing the sets of data and the identifiers of the digital documents in the database.

11. The method of claim 10, wherein extracting the data from each of the digital documents comprises, for each of at least one of the digital documents:

identifying, by the one or more processors, a table from the digital document;

identifying, by the one or processors, content of a paragraph type at a location immediately above and/or below the table within the digital document; and generating, by the one or more processors, a segment containing the identified table and the content of the paragraph type in the record with an identifier of the segment.

12. The method of claim 1, comprising:

responsive to the selection of the submit button on the user interface, retrieving the subset of the sets of data from a first data structured of the database dedicated to storing unstructured data and a set of data from a second data structure of the database dedicated to storing structured data; and generating, by the one or more processors, the response to the natural language query based on both of the subset of data and the set of data.

13. A system comprising:

one or more processors coupled to memory, the memory storing computer-readable instructions that, when executed by the one or more processors, cause the one or more processors to:

receive, from a client device via a first query form presented on a user interface at the client device, a natural language query, the natural language query comprising a request for data regarding one or more of sets of data stored in a database;

parse the natural language query to generate one or more parsed tags each indicating a context of the natural language query;

update a second query form on the user interface with the one or more parsed tags;

responsive to a selection of a submit button on the user interface, retrieve, using one or more generative language models, a subset of the sets of data based on each set of data of the subset corresponding to an assigned category tag that corresponds to at least one of the one or more parsed tags indicated in the second query form on the user interface;
query, using the one or more generative language models, the retrieved subset of the sets of data based on the natural language query to generate a response to the natural language query;
present the generated response at the client device.

14. The system of claim 13, wherein execution of the instructions causes the one or more processors to:
receive digital documents from one or more remote computing devices; and
automatically assign category tags to the digital documents based on the content of the digital documents; and
store a database comprising the sets of data each corresponding to a different digital document uploaded to the one or more processors and corresponding to a category tag assigned to the digital document corresponding to the set of data.

15. The system of claim 14, wherein execution of the instructions causes the one or more processor to automatically assign the category tags to the digital documents by:
parsing each of the digital documents to identify one or more keywords in each of the digital documents; and
generating the category tags for the digital documents based on a mapping between the one or more keywords the category tags stored in a data structure.

16. The system of claim 15, wherein execution of the instructions further causes the one or more processors to:
store the data structure containing the mapping of the one or more keywords to the category tags;
receive an input from a remote computing device comprising a second mapping between a second keyword and a second category tag; and
update the mapping to contain the second mapping between the second keyword and the second category tag,
wherein execution of the instructions causes the one or more processors to generate the category tags for the digital documents by generating the category tags for the digital documents using the updated mapping.

17. The system of claim 13, wherein execution of the instructions causes the one or more processors to parse the natural language query by:
identifying one or more keywords of the natural language query; and
generating the one or more parsed tags based on the one or more keywords of the natural language query.

18. A non-transitory computer-readable medium comprising instructions that, when executed by one or more processors, cause the one or more processors to:
receive, from a client device via a query form presented on a user interface at the client device, a natural language query, the natural language query comprising a request for data regarding one or more of sets of data stored in a database;
parse the natural language query to generate one or more parsed tags each indicating a context of the natural language query;
retrieve, using one or more generative language models, a subset of the sets of data based on each set of data of the subset corresponding to an assigned category tag that corresponds to at least one of the one or more parsed tags;
query, using the one or more generative language models, the retrieved subset of the sets of data based on the natural language query to generate a response to the natural language query; and
present the generated response at the client device.

19. The non-transitory computer-readable medium of claim 18, wherein execution of the instructions further causes the one or more processors to:
receive digital documents from one or more remote computing devices; and
automatically assign category tags to the digital documents based on the content of the digital documents; and
store a database comprising the sets of data each corresponding to a different digital document uploaded to the one or more processors and corresponding to a category tag assigned to the digital document corresponding to the set of data.

20. The non-transitory computer-readable medium of claim 19, wherein execution of the instructions causes the one or more processors to automatically assign the category tags to the digital documents by:
parsing each of the digital documents to identify one or more keywords in each of the digital documents; and
generating the category tags for the digital documents based on a mapping between the one or more keywords the category tags stored in a data structure.

* * * * *